US011022330B2

United States Patent
Allen et al.

(10) Patent No.: US 11,022,330 B2
(45) Date of Patent: Jun. 1, 2021

(54) THREE-WAY HEAT EXCHANGERS FOR LIQUID DESICCANT AIR-CONDITIONING SYSTEMS AND METHODS OF MANUFACTURE

(71) Applicant: Emerson Climate Technologies, Inc., Sidney, OH (US)

(72) Inventors: Mark A. Allen, Essex, MA (US); Scott N. Rowe, Dover, NH (US); Shawn Montgomery, Upton, MA (US); Mark D. Rosenblum, Woburn, MA (US); Peter Luttik, Beverly, MA (US); David Fox, Rockport, MA (US); An Le, Malden, MA (US)

(73) Assignee: EMERSON CLIMATE TECHNOLOGIES, INC., Sidney, OH (US)

( * ) Notice: Subject to any disclaimer, the term of this patent is extended or adjusted under 35 U.S.C. 154(b) by 70 days.

(21) Appl. No.: 15/983,653

(22) Filed: May 18, 2018

(65) Prior Publication Data
US 2019/0353358 A1 Nov. 21, 2019

(51) Int. Cl.
*F24F 3/14* (2006.01)
*F24F 5/00* (2006.01)
*B23P 15/26* (2006.01)

(52) U.S. Cl.
CPC ............ *F24F 3/1417* (2013.01); *B23P 15/26* (2013.01); *F24F 5/0014* (2013.01)

(58) Field of Classification Search
CPC .......... F24F 3/1417; F24F 5/0014; F24F 3/14; B23P 15/26
See application file for complete search history.

(56) References Cited

U.S. PATENT DOCUMENTS 1,791,086 A 2/1931 Sperr
2,221,787 A 11/1940 Downs et al.
(Continued)

FOREIGN PATENT DOCUMENTS

CN 100366981 C 2/2008
CN 101336358 A 12/2008
(Continued)

OTHER PUBLICATIONS

1—Open Absorption System for Cooling and Air Conditioning using Membrane Contactors—Annual Report 2005, Publication No. Publication 260097, Project: 101310—Open Absorption System for Cooling and Air Conditioning using Membrane Contactors, Date of publication: Jan. 30, 2006, Author: Manuel Conde-Petit, Robert Weber, Contractor: M. Conde Engineering.
(Continued)

*Primary Examiner* — Elizabeth J Martin
(74) *Attorney, Agent, or Firm* — Armstrong Teasdale LLP

(57) ABSTRACT

A three-way heat exchanger for a liquid desiccant air-conditioning system and method of manufacture. The heat exchanger includes a plurality of panel assemblies. Each panel assembly has a frame bordering a given space. The frame includes desiccant inlet and outlet ports and heat transfer fluid inlet and outlet ports. Two plates joined to the frame define a heat transfer fluid channel in the given space. The heat transfer fluid inlet and outlet ports are in fluid communication with the heat transfer fluid channel. Microporous sheets cover the outer surfaces of the plates and define a desiccant channel. The desiccant inlet and outlet ports are in fluid communication with the desiccant channel. The plurality of panel assemblies have a stacked arrangement such that a microporous sheet on one panel assembly faces a microporous sheet on an adjacent panel assembly and defines an airflow channel therebetween.

32 Claims, 14 Drawing Sheets

(56) References Cited

U.S. PATENT DOCUMENTS

| | | |
|---|---|---|
| 2,235,322 A | 3/1941 | Martin |
| 2,433,741 A | 12/1947 | Crawford |
| 2,634,958 A | 4/1953 | Simpelaar |
| 2,660,159 A | 11/1953 | Hughes |
| 2,708,915 A | 5/1955 | Mandelburg |
| 2,939,686 A | 6/1960 | Wildermuth |
| 2,988,171 A | 6/1961 | Arnold et al. |
| 3,119,446 A | 1/1964 | Weiss |
| 3,193,001 A | 7/1965 | Meckler |
| 3,276,634 A | 10/1966 | Arnot |
| 3,409,969 A | 11/1968 | Simons |
| 3,410,581 A | 11/1968 | Christensen |
| 3,455,338 A | 7/1969 | Pollit |
| 3,718,181 A | 2/1973 | Reilly et al. |
| 4,100,331 A | 7/1978 | Fletcher et al. |
| 4,164,125 A | 8/1979 | Griffiths |
| 4,176,523 A | 12/1979 | Rousseau |
| 4,205,529 A | 6/1980 | Ko |
| 4,209,368 A | 6/1980 | Coker et al. |
| 4,222,244 A | 9/1980 | Meckler |
| 4,235,221 A | 11/1980 | Murphy |
| 4,239,507 A | 12/1980 | Benoit et al. |
| 4,259,849 A | 4/1981 | Griffiths |
| 4,305,456 A | 12/1981 | Mueller et al. |
| 4,324,947 A | 4/1982 | Dumbeck |
| 4,341,263 A | 7/1982 | Arbabian |
| 4,399,862 A | 8/1983 | Hile |
| 4,429,545 A | 2/1984 | Steinberg |
| 4,435,339 A | 3/1984 | Kragh |
| 4,444,992 A | 4/1984 | Cox, III |
| 4,583,996 A | 4/1986 | Sakata et al. |
| 4,607,132 A | 8/1986 | Jarnagin |
| 4,612,019 A | 9/1986 | Langhorst |
| 4,649,899 A | 3/1987 | Moore |
| 4,660,390 A | 4/1987 | Worthington |
| 4,686,938 A | 8/1987 | Rhodes |
| 4,691,530 A | 9/1987 | Meckler |
| 4,703,629 A | 11/1987 | Moore |
| 4,730,600 A | 3/1988 | Harrigill |
| 4,744,414 A | 5/1988 | Schon |
| 4,766,952 A | 8/1988 | Onodera |
| 4,786,301 A | 11/1988 | Rhodes |
| 4,832,115 A | 5/1989 | Albers et al. |
| 4,872,578 A | 10/1989 | Fuerschbach et al. |
| 4,882,907 A | 11/1989 | Brown, II |
| 4,887,438 A | 12/1989 | Meckler |
| 4,900,448 A | 2/1990 | Bonne et al. |
| 4,910,971 A | 3/1990 | McNab |
| 4,939,906 A | 7/1990 | Spatz et al. |
| 4,941,324 A | 7/1990 | Peterson et al. |
| 4,955,205 A | 9/1990 | Wilkinson |
| 4,971,142 A | 11/1990 | Mergler |
| 4,976,313 A | 12/1990 | Dahlgren et al. |
| 4,979,965 A | 12/1990 | Sannholm |
| 4,984,434 A | 1/1991 | Peterson et al. |
| 4,987,750 A | 1/1991 | Meckler |
| 5,005,371 A | 4/1991 | Yonezawa et al. |
| 5,181,387 A | 1/1993 | Meckler |
| 5,182,921 A | 2/1993 | Yan |
| 5,186,903 A | 2/1993 | Cornwell |
| 5,191,771 A | 3/1993 | Meckler |
| 5,221,520 A | 6/1993 | Cornwell |
| 5,351,497 A | 10/1994 | Lowenstein |
| 5,361,828 A | 11/1994 | Lee et al. |
| 5,375,429 A | 12/1994 | Tokizaki et al. |
| 5,448,895 A | 9/1995 | Coellner et al. |
| 5,462,113 A | 10/1995 | Wand |
| 5,471,852 A | 12/1995 | Meckler |
| 5,528,905 A | 6/1996 | Scarlatti |
| 5,534,186 A | 7/1996 | Walker et al. |
| 5,582,026 A | 12/1996 | Barto, Sr. |
| 5,595,690 A | 1/1997 | Filburn et al. |
| 5,605,628 A | 2/1997 | Davidson et al. |
| 5,606,865 A | 3/1997 | Caron |
| 5,638,900 A | 6/1997 | Lowenstein et al. |
| 5,641,337 A | 6/1997 | Arrowsmith et al. |
| 5,661,983 A | 9/1997 | Groten et al. |
| 5,685,152 A | 11/1997 | Sterling |
| 5,685,485 A | 11/1997 | Mock et al. |
| 5,797,272 A | 8/1998 | James |
| 5,816,065 A | 10/1998 | Maeda |
| 5,832,993 A | 11/1998 | Ohata et al. |
| 5,860,284 A | 1/1999 | Goland et al. |
| 5,860,285 A | 1/1999 | Tulpule |
| 5,928,808 A | 7/1999 | Eshraghi |
| 5,933,702 A | 8/1999 | Goswami |
| 5,950,442 A | 9/1999 | Maeda et al. |
| 6,012,296 A | 1/2000 | Shah |
| 6,018,954 A | 2/2000 | Assaf |
| 6,035,657 A | 3/2000 | Dobak, III et al. |
| 6,083,387 A | 7/2000 | LeBlanc et al. |
| 6,103,969 A | 8/2000 | Bussey |
| 6,131,649 A | 10/2000 | Pearl et al. |
| 6,134,903 A | 10/2000 | Potnis et al. |
| 6,138,470 A | 10/2000 | Potnis et al. |
| 6,156,102 A | 12/2000 | Conrad et al. |
| 6,171,374 B1 | 1/2001 | Barton et al. |
| 6,216,483 B1 | 4/2001 | Potnis et al. |
| 6,216,489 B1 | 4/2001 | Potnis et al. |
| 6,244,062 B1 | 6/2001 | Prado |
| 6,247,604 B1 | 6/2001 | Taskis et al. |
| 6,266,975 B1 | 7/2001 | Assaf |
| 6,417,423 B1 | 7/2002 | Koper et al. |
| 6,442,951 B1 | 9/2002 | Maeda et al. |
| 6,463,750 B2 | 10/2002 | Assaf |
| 6,487,872 B1 | 12/2002 | Forkosh et al. |
| 6,488,900 B1 | 12/2002 | Call et al. |
| 6,497,107 B2 | 12/2002 | Maisotsenko et al. |
| 6,497,749 B2 | 12/2002 | Kesten et al. |
| 6,502,807 B1 | 1/2003 | Assaf et al. |
| 6,514,321 B1 | 2/2003 | Lehto et al. |
| 6,539,731 B2 | 4/2003 | Kesten et al. |
| 6,546,746 B2 | 4/2003 | Forkosh et al. |
| 6,557,365 B2 | 5/2003 | Dinnage et al. |
| 6,660,069 B2 | 12/2003 | Sato et al. |
| 6,684,649 B1 | 2/2004 | Thompson |
| 6,739,142 B2 | 5/2004 | Korin |
| 6,745,826 B2 | 6/2004 | Lowenstein et al. |
| 6,766,817 B2 | 7/2004 | Da Silva et al. |
| 6,848,265 B2 | 2/2005 | Lowenstein et al. |
| 6,854,278 B2 | 2/2005 | Maisotsenko et al. |
| 6,854,279 B1 | 2/2005 | Digiovanni et al. |
| 6,918,404 B2 | 7/2005 | Dias da Silva et al. |
| 6,938,434 B1 | 9/2005 | Fair |
| 6,945,065 B2 | 9/2005 | Lee et al. |
| 6,976,365 B2 | 12/2005 | Forkosh et al. |
| 6,986,428 B2 | 1/2006 | Hester et al. |
| 7,066,586 B2 | 6/2006 | da Silva et al. |
| RE39,288 E | 9/2006 | Assaf |
| 7,143,597 B2 | 12/2006 | Hyland et al. |
| 7,191,821 B2 | 3/2007 | Gronwall et al. |
| 7,197,887 B2 | 4/2007 | Maisotsenko et al. |
| 7,228,891 B2 | 6/2007 | Shin et al. |
| 7,258,923 B2 | 8/2007 | van den Bogerd et al. |
| 7,269,966 B2 | 9/2007 | Lowenstein et al. |
| 7,279,215 B2 | 10/2007 | Hester et al. |
| 7,306,650 B2 | 12/2007 | Slayzak et al. |
| 7,337,615 B2 | 3/2008 | Reidy |
| 7,430,878 B2 | 10/2008 | Assaf |
| 7,758,671 B2 | 7/2010 | Kesten et al. |
| 7,841,201 B2 | 11/2010 | Sedlak et al. |
| 7,930,896 B2 | 4/2011 | Matsui et al. |
| 7,938,888 B2 | 5/2011 | Assaf |
| 8,141,379 B2 | 3/2012 | Al-Hadhrami et al. |
| 8,337,590 B2 | 12/2012 | Herencia et al. |
| 8,353,175 B2 | 1/2013 | Wohlert |
| 8,496,732 B2 | 7/2013 | Culp et al. |
| 8,499,576 B2 | 8/2013 | Meijer |
| 8,500,960 B2 | 8/2013 | Ehrenberg et al. |
| 8,623,210 B2 | 1/2014 | Manabe et al. |
| 8,641,806 B2 | 2/2014 | Claridge et al. |
| 8,648,209 B1 | 2/2014 | Lastella |
| 8,695,363 B2 | 4/2014 | Tang et al. |
| 8,696,805 B2 | 4/2014 | Chang et al. |

(56) References Cited

U.S. PATENT DOCUMENTS

| | | |
|---|---|---|
| 8,769,971 B2 | 7/2014 | Kozubal et al. |
| 8,790,454 B2 | 7/2014 | Lee et al. |
| 8,800,308 B2 | 8/2014 | Vandermeulen et al. |
| 8,876,943 B2 | 11/2014 | Gottlieb et al. |
| 8,881,806 B2 | 11/2014 | Xie et al. |
| 8,943,844 B2 | 2/2015 | Forkosh |
| 8,943,850 B2 | 2/2015 | Vandermeulen et al. |
| 8,968,945 B2 | 3/2015 | Fasold et al. |
| 9,000,289 B2 | 4/2015 | Vandermeulen et al. |
| 9,086,223 B2 | 7/2015 | Vandermeulen et al. |
| 9,101,874 B2 | 8/2015 | Vandermeulen |
| 9,101,875 B2 | 8/2015 | Vandermeulen et al. |
| 9,243,810 B2 | 1/2016 | Vandermeulen et al. |
| 9,273,877 B2 | 3/2016 | Vandermeulen et al. |
| 9,308,490 B2 | 4/2016 | Vandermeulen et al. |
| 9,377,207 B2 | 6/2016 | Vandermeulen et al. |
| 9,429,332 B2 | 8/2016 | Vandermeulen et al. |
| 9,470,426 B2 | 10/2016 | Vandermeulen |
| 9,506,697 B2 | 11/2016 | Vandermeulen |
| 9,631,823 B2 | 4/2017 | Vandermeulen et al. |
| 9,631,824 B1 | 4/2017 | Maisey et al. |
| 9,631,848 B2 | 4/2017 | Vandermeulen et al. |
| 9,709,285 B2 | 7/2017 | Vandermeulen |
| 9,709,286 B2 | 7/2017 | Vandermeulen et al. |
| 9,835,340 B2 | 12/2017 | Vandermeulen et al. |
| 10,006,648 B2 | 6/2018 | Vandermeulen et al. |
| 10,024,558 B2 | 7/2018 | Vandermeulen |
| 10,024,601 B2 | 7/2018 | Vandermeulen |
| 10,168,056 B2 | 1/2019 | Vandermeulen et al. |
| 10,323,867 B2 | 6/2019 | Vandermeulen |
| 10,591,191 B2 | 3/2020 | Christians et al. |
| 10,619,867 B2 | 4/2020 | Vandermeulen |
| 10,619,868 B2 | 4/2020 | Vandermeulen |
| 10,619,895 B1 | 4/2020 | Vandermeulen |
| 10,731,876 B2 | 8/2020 | Vandermeulen |
| 2001/0008148 A1 | 7/2001 | Ito et al. |
| 2001/0013226 A1 | 8/2001 | Potnis et al. |
| 2001/0015500 A1 | 8/2001 | Shimanuki et al. |
| 2002/0023740 A1 | 2/2002 | Lowenstein et al. |
| 2002/0026797 A1 | 3/2002 | Sundhar |
| 2002/0038552 A1 | 4/2002 | Maisotsenko et al. |
| 2002/0098395 A1 | 7/2002 | Shimanuki et al. |
| 2002/0104439 A1 | 8/2002 | Komkova et al. |
| 2002/0139245 A1 | 10/2002 | Kesten et al. |
| 2002/0139320 A1 | 10/2002 | Shimanuki et al. |
| 2002/0148602 A1 | 10/2002 | Nakamura |
| 2003/0000230 A1 | 1/2003 | Kopko |
| 2003/0029185 A1 | 2/2003 | Kopko |
| 2003/0033821 A1 | 2/2003 | Maisotsenko et al. |
| 2003/0051367 A1 | 3/2003 | Griffin |
| 2003/0051498 A1 | 3/2003 | Sanford |
| 2003/0106680 A1 | 6/2003 | Serpico et al. |
| 2003/0121271 A1 | 7/2003 | Dinnage et al. |
| 2003/0209017 A1 | 11/2003 | Maisotsenko et al. |
| 2003/0230092 A1 | 12/2003 | Lowenstein et al. |
| 2004/0040697 A1 | 3/2004 | Pierre et al. |
| 2004/0061245 A1 | 4/2004 | Maisotsenko et al. |
| 2004/0101698 A1 | 5/2004 | Yamanaka et al. |
| 2004/0109798 A1 | 6/2004 | Chopard et al. |
| 2004/0112077 A1 | 6/2004 | Forkosh et al. |
| 2004/0118125 A1 | 6/2004 | Potnis et al. |
| 2004/0134212 A1 | 7/2004 | Lee et al. |
| 2004/0168462 A1 | 9/2004 | Assaf |
| 2004/0194944 A1 | 10/2004 | Hendricks et al. |
| 2004/0211207 A1 | 10/2004 | Forkosh et al. |
| 2004/0230092 A1 | 11/2004 | Thierfelder et al. |
| 2004/0231512 A1 | 11/2004 | Slayzak et al. |
| 2004/0261440 A1 | 12/2004 | Forkosh et al. |
| 2005/0095433 A1 | 5/2005 | Bogerd et al. |
| 2005/0106021 A1 | 5/2005 | Bunker et al. |
| 2005/0109052 A1 | 5/2005 | Albers et al. |
| 2005/0133082 A1 | 6/2005 | Konold et al. |
| 2005/0210907 A1 | 9/2005 | Gillan et al. |
| 2005/0217485 A1 | 10/2005 | Olapinski et al. |
| 2005/0218535 A1 | 10/2005 | Maisotsenko et al. |
| 2005/0257551 A1 | 11/2005 | Landry |
| 2006/0042295 A1 | 3/2006 | Assaf |
| 2006/0070728 A1 | 4/2006 | Shin et al. |
| 2006/0124287 A1 | 6/2006 | Reinders |
| 2006/0156750 A1 | 7/2006 | Lowenstein et al. |
| 2006/0156761 A1 | 7/2006 | Mola et al. |
| 2006/0278089 A1 | 12/2006 | Theilow |
| 2007/0169916 A1 | 7/2007 | Wand et al. |
| 2007/0175234 A1 | 8/2007 | Pruitt |
| 2007/0234743 A1 | 10/2007 | Assaf |
| 2008/0127965 A1 | 6/2008 | Burton |
| 2008/0156471 A1 | 7/2008 | Han et al. |
| 2008/0196758 A1 | 8/2008 | McGuire |
| 2008/0203866 A1 | 8/2008 | Chamberlain |
| 2008/0302357 A1 | 12/2008 | Denault |
| 2008/0314567 A1 | 12/2008 | Noren |
| 2009/0000732 A1 | 1/2009 | Jacobine et al. |
| 2009/0056919 A1 | 3/2009 | Hoffman et al. |
| 2009/0095162 A1 | 4/2009 | Hargis et al. |
| 2009/0126913 A1 | 5/2009 | Lee et al. |
| 2009/0173096 A1 | 7/2009 | Wohlert |
| 2009/0183857 A1 | 7/2009 | Pierce et al. |
| 2009/0200022 A1 | 8/2009 | Bravo et al. |
| 2009/0238685 A1 | 9/2009 | Santa Ana |
| 2010/0000247 A1 | 1/2010 | Bhatti et al. |
| 2010/0012309 A1 | 1/2010 | Uges |
| 2010/0018322 A1 | 1/2010 | Neitzke et al. |
| 2010/0051083 A1 | 3/2010 | Boyk |
| 2010/0077783 A1 | 4/2010 | Bhatti et al. |
| 2010/0084120 A1 | 4/2010 | Yin et al. |
| 2010/0170776 A1 | 7/2010 | Ehrenberg et al. |
| 2010/0319370 A1 | 12/2010 | Kozubal et al. |
| 2011/0073290 A1 | 3/2011 | Chang et al. |
| 2011/0100618 A1 | 5/2011 | Carlson |
| 2011/0101117 A1 | 5/2011 | Miyauchi et al. |
| 2011/0126885 A1 | 6/2011 | Kokotov et al. |
| 2011/0132027 A1 | 6/2011 | Gommed et al. |
| 2011/0209858 A1 | 9/2011 | Konno |
| 2012/0052785 A1 | 3/2012 | Nagamatsu et al. |
| 2012/0114527 A1 | 5/2012 | Hoglund et al. |
| 2012/0118148 A1 | 5/2012 | Culp et al. |
| 2012/0118155 A1 | 5/2012 | Claridge et al. |
| 2012/0125020 A1 | 5/2012 | Vandermeulen et al. |
| 2012/0125021 A1 | 5/2012 | Vandermeulen et al. |
| 2012/0125031 A1 | 5/2012 | Vandermeulen et al. |
| 2012/0125581 A1 | 5/2012 | Allen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0132513 A1 | 5/2012 | Vandermeulen et al. |
| 2012/0152318 A1 | 6/2012 | Kee |
| 2012/0186281 A1 | 7/2012 | Vandermeulen et al. |
| 2013/0056177 A1 | 3/2013 | Coutu et al. |
| 2013/0101909 A1 | 4/2013 | Fasold et al. |
| 2013/0186121 A1 | 7/2013 | Erb et al. |
| 2013/0199220 A1 | 8/2013 | Ma et al. |
| 2013/0227982 A1 | 9/2013 | Forkosh |
| 2013/0255287 A1 | 10/2013 | Forkosh |
| 2013/0340449 A1 | 12/2013 | Kozubal et al. |
| 2014/0054004 A1 | 2/2014 | LePoudre et al. |
| 2014/0054013 A1 | 2/2014 | LePoudre et al. |
| 2014/0150481 A1 | 6/2014 | Vandermeulen |
| 2014/0150656 A1 | 6/2014 | Vandermeulen |
| 2014/0150657 A1 | 6/2014 | Vandermeulen et al. |
| 2014/0150662 A1* | 6/2014 | Vandermeulen ....... B01D 53/18 96/295 |
| 2014/0223947 A1 | 8/2014 | Ranjan et al. |
| 2014/0245769 A1 | 9/2014 | Vandermeulen et al. |
| 2014/0250935 A1 | 9/2014 | Prochaska et al. |
| 2014/0260367 A1 | 9/2014 | Coutu et al. |
| 2014/0260369 A1 | 9/2014 | LePoudre |
| 2014/0260371 A1 | 9/2014 | Vandermeulen |
| 2014/0260398 A1 | 9/2014 | Kozubal et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0264968 A1* | 9/2014 | Erb ....... F24F 12/006 261/100 |
| 2014/0360373 A1 | 12/2014 | Peacos et al. |

(56) References Cited

U.S. PATENT DOCUMENTS

| | | |
|---|---|---|
| 2014/0366567 A1 | 12/2014 | Vandermeulen |
| 2015/0107287 A1 | 4/2015 | Forkosh |
| 2015/0153210 A1 | 6/2015 | Bartlett et al. |
| 2015/0184876 A1 | 7/2015 | Vandermeulen et al. |
| 2015/0300754 A1* | 10/2015 | Vandermeulen .......... F28F 1/10 165/109.1 |
| 2015/0316288 A1 | 11/2015 | Erickson et al. |
| 2015/0323216 A1 | 11/2015 | Wallin |
| 2015/0338140 A1 | 11/2015 | Vandermeulen |
| 2016/0187011 A1 | 6/2016 | Vandermeulen |
| 2016/0290665 A1 | 10/2016 | Vandermeulen et al. |
| 2016/0290666 A1 | 10/2016 | Coutu et al. |
| 2017/0074530 A1 | 3/2017 | Kozubal |
| 2017/0102155 A1 | 4/2017 | Vandermeulen |
| 2017/0106639 A1 | 4/2017 | Vandermeulen et al. |
| 2017/0167794 A1 | 6/2017 | Vandermeulen |
| 2017/0184319 A1 | 6/2017 | Vandermeulen et al. |
| 2017/0241655 A1 | 8/2017 | LePoudre et al. |
| 2017/0292722 A1 | 10/2017 | Vandermeulen |
| 2018/0051897 A1 | 2/2018 | Vandermeulen et al. |
| 2018/0163977 A1 | 6/2018 | Vandermeulen |
| 2020/0096241 A1 | 3/2020 | Vandermeulen |
| 2020/0141593 A1 | 5/2020 | Vandermeulen et al. |
| 2020/0173671 A1 | 6/2020 | Rowe et al. |
| 2020/0182493 A1 | 6/2020 | Luttik |

FOREIGN PATENT DOCUMENTS

| | | |
|---|---|---|
| CN | 100476308 C | 4/2009 |
| CN | 101636630 A | 1/2010 |
| CN | 102282426 A | 12/2011 |
| CN | 202229469 U | 5/2012 |
| CN | 202734094 U | 2/2013 |
| EP | 0781972 A2 | 7/1997 |
| EP | 1120609 A1 | 8/2001 |
| EP | 1563229 A1 | 8/2005 |
| EP | 1781995 A1 | 5/2007 |
| EP | 2256434 A2 | 12/2010 |
| EP | 2306100 A1 | 4/2011 |
| EP | 2787293 A1 | 10/2014 |
| GB | 1172247 A | 11/1969 |
| JP | S54-77443 A | 6/1979 |
| JP | S62-297647 A | 12/1987 |
| JP | 02306067 A | 12/1990 |
| JP | H03-125830 A | 5/1991 |
| JP | H03-213921 A | 9/1991 |
| JP | H08-105669 A | 4/1996 |
| JP | H09-184692 A | 7/1997 |
| JP | H10-2209174 A | 8/1998 |
| JP | H11-137948 A | 5/1999 |
| JP | H11-197439 A | 7/1999 |
| JP | H11-341700 A | 12/1999 |
| JP | 2000-230730 A | 8/2000 |
| JP | 2001-517773 A | 10/2001 |
| JP | 2002-206834 A | 7/2002 |
| JP | 2004-524504 A | 8/2004 |
| JP | 2005-134060 A | 5/2005 |
| JP | 2006-263508 A | 10/2006 |
| JP | 2006-529022 A | 12/2006 |
| JP | 2008-020138 A | 1/2008 |
| JP | 2009-517622 A | 4/2009 |
| JP | 2009-04273555 B2 | 6/2009 |
| JP | 2009-180433 A | 8/2009 |
| JP | 2009-192101 A | 8/2009 |
| JP | 2009-281668 A | 12/2009 |
| JP | 2009-293831 A | 12/2009 |
| JP | 201054136 A | 3/2010 |
| JP | 2010-247022 A | 11/2010 |
| JP | 2011-064359 A | 3/2011 |
| JP | 2011-511244 A | 4/2011 |
| JP | 201192815 A | 5/2011 |
| JP | 2011-163682 A | 8/2011 |
| JP | 2012-073013 A | 4/2012 |
| JP | 2013-064549 A | 4/2013 |
| KR | 10-2001-0017939 A | 3/2001 |
| KR | 2004-0026242 A | 3/2004 |
| KR | 10-0510774 B1 | 8/2005 |
| KR | 2014-0022785 A | 2/2014 |
| TW | 201009269 A | 3/2010 |
| WO | WO-1997021061 A1 | 6/1997 |
| WO | WO-1999022180 A1 | 5/1999 |
| WO | WO-2000011426 A1 | 3/2000 |
| WO | WO-2000055546 A1 | 9/2000 |
| WO | WO-2002066901 A1 | 8/2002 |
| WO | WO-2002086391 A1 | 10/2002 |
| WO | WO-2003004937 A1 | 1/2003 |
| WO | WO-2004046618 A1 | 6/2004 |
| WO | WO-2006006177 A1 | 1/2006 |
| WO | WO-2008037079 A1 | 4/2008 |
| WO | WO-2009094032 A1 | 7/2009 |
| WO | WO-2009144880 A1 | 12/2009 |
| WO | WO-2009157277 A1 | 12/2009 |
| WO | WO-2011062808 A1 | 5/2011 |
| WO | WO-2011150081 A2 | 12/2011 |
| WO | WO-2011161547 A2 | 12/2011 |
| WO | WO-2012071036 A1 | 5/2012 |
| WO | WO-2012082093 A1 | 6/2012 |
| WO | WO-2013172789 A1 | 11/2013 |

OTHER PUBLICATIONS

2—Open Absorption System for Cooling and Air Conditioning using Membrane Contactors—Annual, Report 2006, Publication No. Publication 260098, Project: 101310—Open Absorption System for Cooling and Air Conditioning using Membrane Contactors, Date of publication: Nov. 14, 2006, Author: Manuel Conde-Petit, Robert Weber, Contractor: M. Conde Engineering.

3—Open Absorption System for Cooling and Air Conditioning Using Membrane Contactors—Final Report, Publication No. Publication 280139, Project: 101310—Open Absorption System for Cooling and Air Conditioning using Membrane Contactors, Date of publication: Jul. 8, 2008, Author: Viktor Dorer, Manuel Conde-Petit, Robert Weber, Contractor: M. Conde Engineering.

4—Conde-Petit, M. 2007. Liquid Desiccant-Based Air-Conditioning Systems—LDACS, Proc. of the 1st European Conference on Polygeneration—Technologies and Applications, 217-234, A. Coronas, ed., Tarragona—Spain, Oct. 16-17, Published by CREVER—Universitat Rovira I Virgili, Tarragona, Spain.

5—Conde-Petit, M. 2008. Open Absorption Systems for Air-Conditioning using Membrane Contactors,Proceedings '15. Schweizerisches Status-Seminar «Energie—und Umweltforschung im Bauwesen»', Sep. 11-12—ETH Zurich, Switzerland. Published by Brenet—Eggwilstr. 16a, CH-9552 Bronschhofen—Switzerland (brenet@vogel-tech.ch).

6—Third Party Observations for PCT/US2011/037936, dated Sep. 24, 2012.

Ashrae, et al., "Desiccant Dehumidification and Pressue Drying Equipment," 2012 ASHRAE Handbook—HVAC Systems and Equipment, Chapter 24, pp. 24.1-24.12.

Beccali, et al., "Energy and Economic Assessment of Desiccant Cooling," Solar Energy, Issue 83, pp. 1828-1846, Aug. 2009.

Fimbres-Weihs, et al., "Review of 3D CFD modeling of flow and mass transfer in narrow spacer-filled channels in membrane modules," Chemical Engineering and Processing 49 (2010) pp. 759-781.

Lowenstein, "A Solar Liquid-Desiccant Air Conditioner," Solar 2003, Proceedings of the 32nd ASES Annual Conference, Austin, TX, Jul. 2003.

Li, F., et al., "Novel spacers for mass transfer enhancement in membrane separations," Journal of Membrane Science, 253 (2005), pp. 1-12.

Li, Y., et al., "CFD simulation of fluid flow through spacer-filled membrane module: selecting suitable cell types for periodic boundary conditions," Desalination 233 (2008) pp. 351-358.

Liu, et al., "Research Progress in Liquid Desiccant Air Conditioning Devices and Systems," Frontiers of Energy and Power Engineering in China, vol. 4, Issue 1, pp. 55-65, Feb. 2010.

Mathioulakis, "Desalination by Using Alternative Energy," Desalination, Issue 203, pp. 346-365, 2007.

(56) References Cited

OTHER PUBLICATIONS

Perry "Perry's Chemical Engineers handbook" 1999 McGraw Hill p. 11-52,11-53.
Russell, et al., "Optimization of Photovolatic Thermal Collector Heat Pump Systems," ISES International Solar Energy Conference, Atlanta, GA, vol. 3, pp. 1870-1874, May 1979.
"Siphon." Encyclopedia Americana. Grolier Online, 2015. Web. Apr. 3, 2015. 1 page.
Welty, "Liquid Desiccant Dehumidification," Engineered Systems, May 2010, vol. 27 Issue 5, p. 34.
International Search Report and Written Opinion for International Application No. PCT/US2019/032188 dated Sep. 2, 2019.
Lachner, "An Investigation into the Feasibility of the Use of Water as a Refrigerant," International Refrigeration and Air Conditioning Conference, 723:1-9 (2004).
Refrigerant—Random House Kernerman Webster's College Dictionary, "Refrigerant," Random House, <https://thefreedictionary.com/refrigerant> (2010).

\* cited by examiner

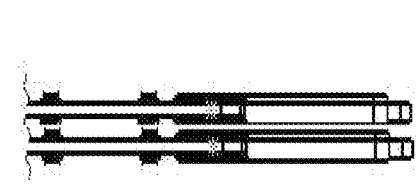
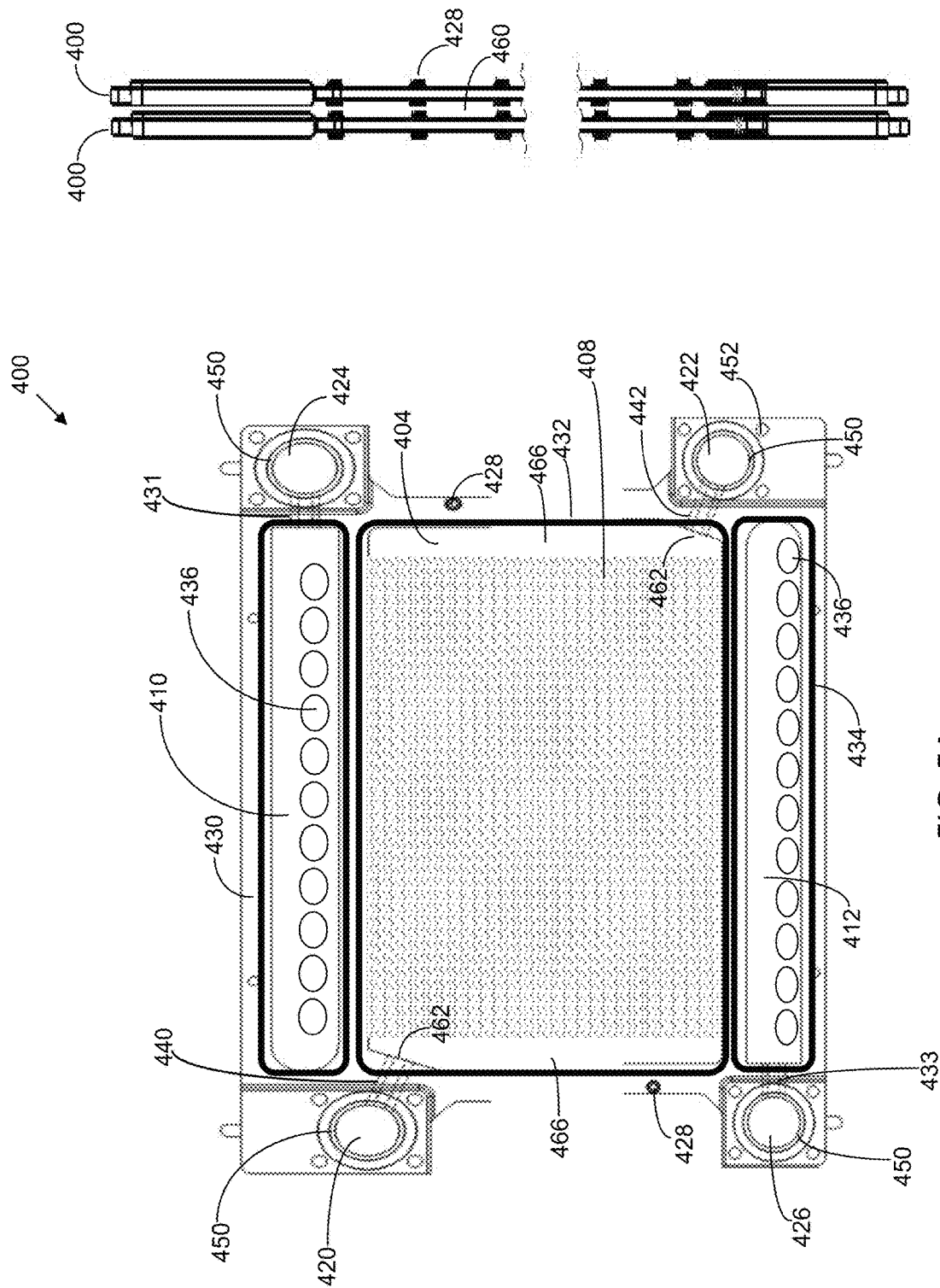
FIG. 5B
FIG. 5A

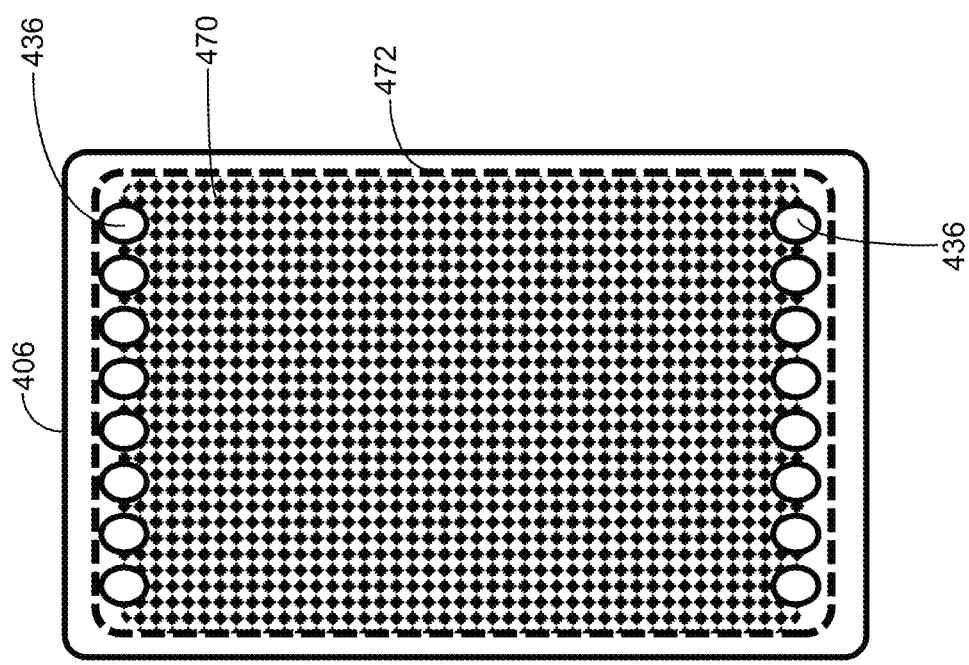

THREE-WAY HEAT EXCHANGERS FOR LIQUID DESICCANT AIR-CONDITIONING SYSTEMS AND METHODS OF MANUFACTURE

BACKGROUND

The present application relates generally to liquid desiccant air conditioning systems and, more specifically, to improved panel assembly blocks in such systems facilitating heat and/or moisture transfer between air, heat transfer fluid, and liquid desiccant streams.

SUMMARY

In accordance with one or more embodiments, a three-way heat exchanger is disclosed comprising a plurality of panel assemblies for a liquid desiccant air-conditioning system. Each of the panel assemblies comprises a frame, two plates joined to the frame, and microporous sheets on the plates. The frame borders a given space, and includes a liquid desiccant inlet port, a liquid desiccant outlet port, a heat transfer fluid inlet port, and a heat transfer fluid outlet port. Each of the plates has an outer surface and an inner surface. The plates are joined to the frame to define a heat transfer fluid channel in the given space defined by the inner surfaces of the plates and the frame. The heat transfer fluid inlet port and the heat transfer fluid outlet port are in fluid communication with the heat transfer fluid channel. The microporous sheets permit transfer of water vapor therethrough. Each microporous sheet covers the outer surface of a different one of the two plates and defines a liquid desiccant channel between the microporous sheet and the outer surface of the plate. The liquid desiccant inlet port and the liquid desiccant outlet port are in fluid communication with the liquid desiccant channel. The panel assemblies are stacked such that a microporous sheet on one panel assembly faces a microporous sheet on an adjacent panel assembly and defines an airflow channel therebetween. The liquid desiccant inlet ports of the panel assemblies are aligned to form a liquid desiccant inlet manifold. The liquid desiccant outlet ports of the panel assemblies are aligned to form a liquid desiccant outlet manifold. The heat transfer fluid inlet ports of the panel assemblies are aligned to form a heat transfer fluid inlet manifold. The heat transfer fluid outlet ports of the panel assemblies are aligned to form a heat transfer fluid outlet manifold.

In accordance with one or more embodiments, a method is disclosed for manufacturing a three-way heat exchanger for a liquid desiccant air-conditioning system. The method includes the steps of manufacturing each of a plurality of panel assemblies and arranging the panel assemblies in a stack to form the heat exchanger. The panel assemblies are manufactured by: (i) covering an outer surface of each of two plates with a microporous sheet permitting transfer of water vapor therethrough, such that a liquid desiccant channel is defined between each microporous sheet and the outer surface of each plate; and (ii) joining the two plates to a frame structure. The frame structure borders a given space. The frame structure includes a liquid desiccant inlet port, a liquid desiccant outlet port, a heat transfer fluid inlet port, and a heat transfer fluid outlet port. The plates each have an inner surface opposite the outer surface, and the plates are joined to the frame to define a heat transfer fluid channel in the given space defined by the inner surfaces of the plates and the frame. The heat transfer fluid inlet port and the heat transfer fluid outlet port are in fluid communication with the heat transfer fluid channel. The liquid desiccant inlet port and the liquid desiccant outlet port are in fluid communication with the liquid desiccant channel. The panel assemblies are arranged in a stack such that one of the microporous sheets on one panel assembly faces one of the microporous sheets on an adjacent panel assembly and defines an airflow channel therebetween. The liquid desiccant inlet ports of the panel assemblies are aligned to form a liquid desiccant inlet manifold, and the liquid desiccant outlet ports of the panel assemblies are aligned to form a liquid desiccant outlet manifold. The heat transfer fluid inlet ports of the panel assemblies are aligned to form a heat transfer fluid inlet manifold, and the heat transfer fluid outlet ports of the panel assemblies are aligned to form a heat transfer fluid outlet manifold.

BRIEF DESCRIPTION OF THE FIGURES

FIGS. 5A and 5B are simplified diagrams of front and side views of an exemplary 3 way heat exchanger panel assembly in accordance with one or more embodiments.

FIG. 6 is a simplified diagram illustrating an exemplary plate of a panel assembly in accordance with one or more embodiments.

DETAILED DESCRIPTION

Figure 1:
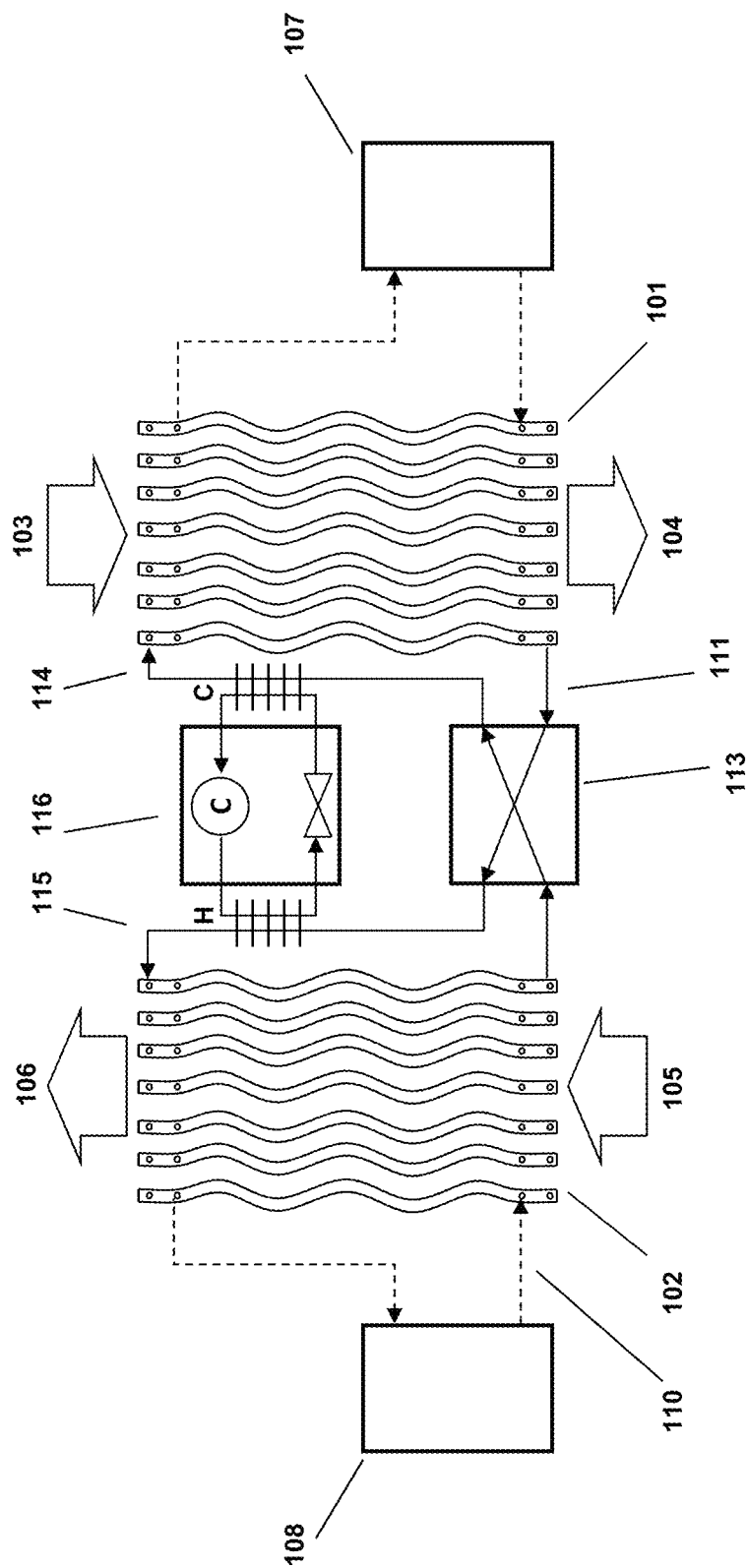
FIG. 1 is a simplified diagram illustrating a prior art liquid desiccant air-conditioning system.

FIG. 1 illustrates an exemplary prior art liquid desiccant air conditioning system as disclosed in U.S. Patent Application Publication No. 20120125020 used in a cooling and dehumidifying mode of operation. A conditioner 101 comprises a set of 3-way heat exchange plate structures that are internally hollow. A cold heat transfer fluid is generated in a cold source 107 and introduced into the plates. A liquid desiccant solution at 114 is flowed onto the outer surface of the plates. The liquid desiccant runs along the outer surface of each of the plates behind a thin membrane, which is located between the air flow and the surface of the plates. Outside air 103 is blown between the set of conditioner plates. The liquid desiccant on the surface of the plates attracts the water vapor in the air flow and the cooling water (heat transfer fluid) inside the plates helps to inhibit the air temperature from rising. The treated air 104 is introduced into a building space.

The liquid desiccant is collected at the other end of the conditioner plates at 111 and is transported through a heat exchanger 113 to the liquid desiccant entry point 115 of the regenerator 102 where the liquid desiccant is distributed across similar plates in the regenerator. Return air, outside air 105, or a mixture thereof is blown across the regenerator plates and water vapor is transported from the liquid desiccant into the leaving air stream 106. An optional heat source 108 provides the driving force for the regeneration. A hot heat transfer fluid 110 from a heat source can be flowed inside the plates of the regenerator similar to the cold heat transfer fluid in the conditioner. Again, the liquid desiccant is collected at one end of the plates and returned via the heat exchanger to the conditioner. Since there is no need for either a collection pan or bath, the desiccant flow through the regenerator can be horizontal or vertical.

In order for the liquid desiccant to sufficiently completely wet out the membrane, the liquid desiccant is distributed over substantially the full surface of the plate behind the membrane. This can be done through a combination of pressure driven flow of the liquid desiccant through a <0.13 mm thick channel with a geometry that ensures that the channel is filled. Resistance to the liquid desiccant flow at the end of the panel can be used to further improve wetting out at a given pressure drop between the liquid desiccant inlet and outlet.

An optional heat pump 116 can be used to provide cooling and heating of the liquid desiccant. It is also possible to connect a heat pump between the cold source 107 and the hot source 108, which is thus pumping heat from the cooling fluids rather than the liquid desiccant. Cold sources could comprise an indirect evaporative cooler, a cooling tower, geothermal storage, cold water networks, black roof panel that cools down water during the night, and cold storage options like an ice box. Heat sources could include waste heat from power generation, solar heat, geothermal heat, heat storage, and hot water networks.

Figure 2:
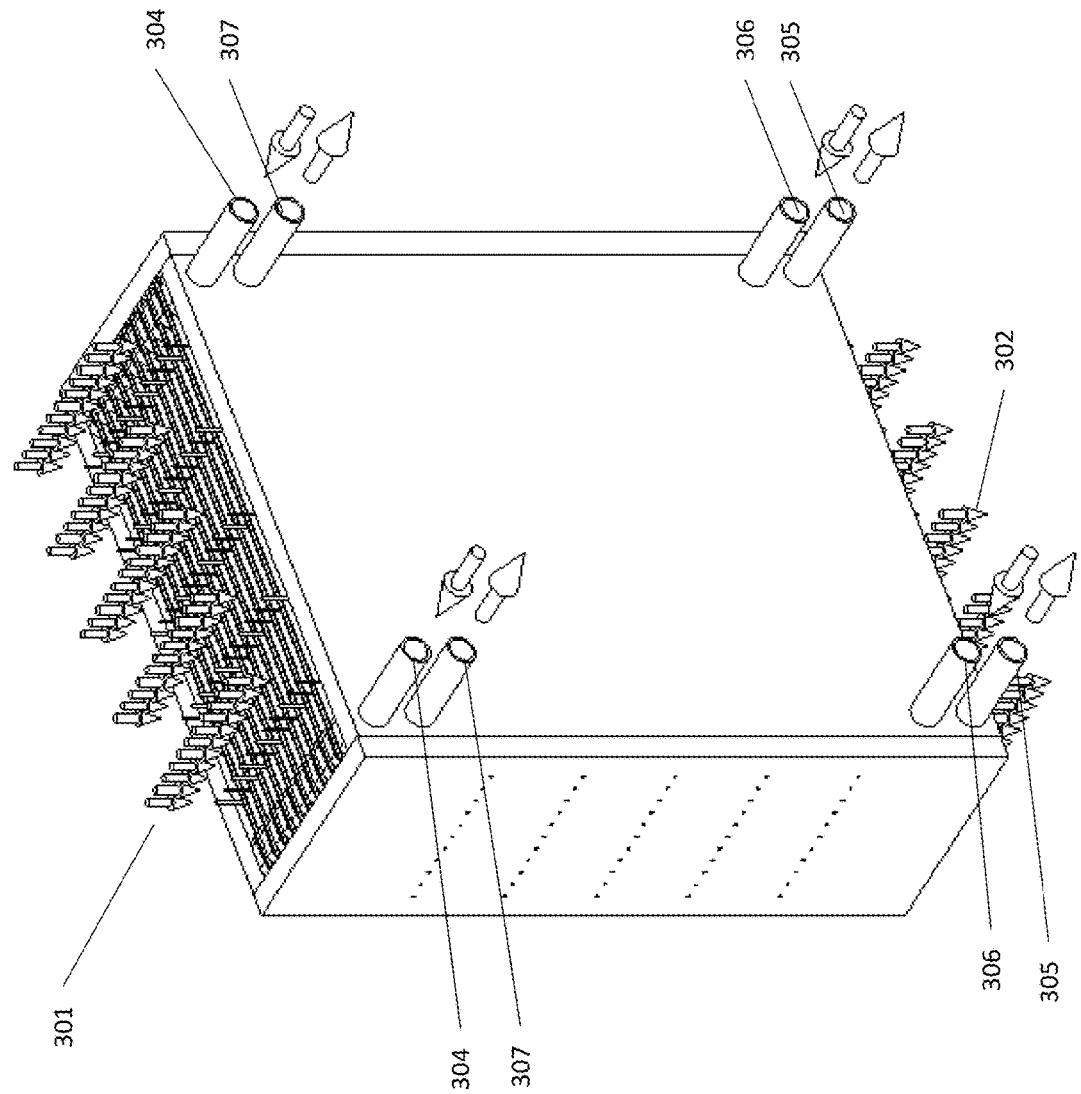
FIG. 2 illustrates a prior art three-way heat exchanger block.

FIG. 2 illustrates an exemplary prior art 3-way heat exchanger comprising a set of plate structures stacked in a block as disclosed in U.S. Pat. No. 9,308,490. A liquid desiccant enters the structure through ports 304 and is directed behind a series of membranes as described in FIG. 1. The liquid desiccant is collected and removed through ports 305. A cooling or heating fluid is provided through ports 306 and runs counter to the air stream 301 inside the hollow plate structures, again as described in FIG. 1 and in more detail in FIG. 3. The cooling or heating fluids exit through ports 307. The treated air 302 is directed to a space in a building or is exhausted as the case may be. The figure illustrates a 3-way heat exchanger in which the air and heat transfer fluid are in a primarily vertical orientation.

Figure 3:
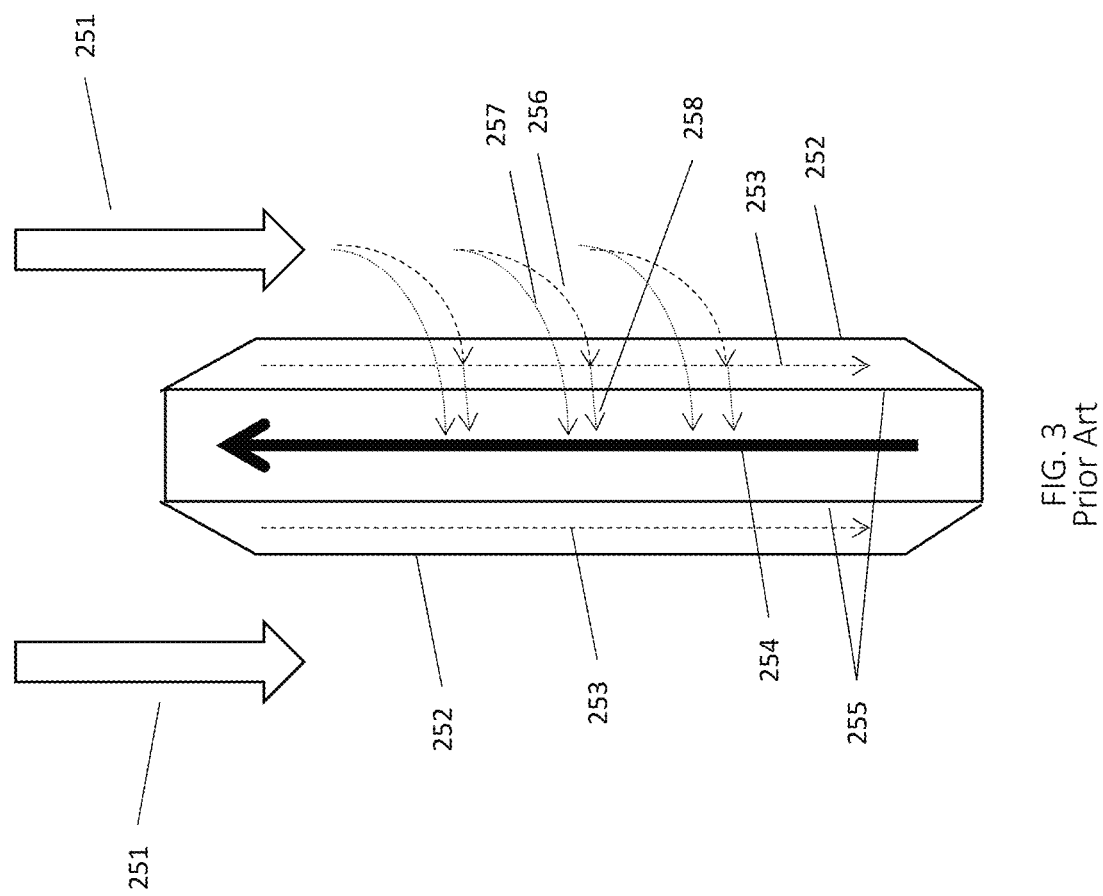
FIG. 3 is a simplified diagram illustrating a priority three-way heat exchanger panel assembly.

FIG. 3 schematically illustrates operation of an exemplary prior art membrane plate assembly or structure as disclosed in U.S. Pat. No. 9,631,848. The air stream 251 flows counter to a cooling fluid stream 254. Membranes 252 contain a liquid desiccant 253 that is falling along the wall 255 that contains the heat transfer fluid 254. Water vapor 256 entrained in the air stream is able to transfer through the membrane 252 and is absorbed into the liquid desiccant 253. The heat of condensation of water 258 that is released during the absorption is conducted through the wall 255 into the heat transfer fluid 254. Sensible heat 257 from the air stream is also conducted through the membrane 252, liquid desiccant 253 and wall 255 into the heat transfer fluid 254.

U.S. Pat. No. 8,943,850 discloses various membrane plate structures for liquid desiccant air conditioning systems. U.S. Pat. No. 9,308,490 discloses manufacturing methods and details for manufacturing membrane plate structures.

Various embodiments disclosed herein relate to improved panel assemblies that can be stacked into three-way heat exchanger blocks for use in liquid desiccant air-conditioning systems, including in dedicated outdoor air systems (DOAS). The panel assemblies improve heat exchanger performance by enabling more uniform air and heat transfer fluid flows via more uniformly consistent air channels and heat transfer fluid distribution manifolds. Product life expectancy is also increased for various reasons, including that glue bonds are replaced with laser heat welds in accordance with one or more embodiments. Other direct or indirect heat welds are also possible including induction welding. One advantage of such processes is that the welds do not adversely affect or damage the membrane. In addition, the panel assemblies can be more easily manufactured by eliminating slow robot or manual gluing steps. Such gluing steps are not suited for high-volume manufacturing and increase risks for leaks. Additionally, the improved panel design allows for easy assembly. Furthermore, individual panel assemblies in a block may be easily replaced if needed due to the O-ring construction of the panel assembly block.

Figure 4:
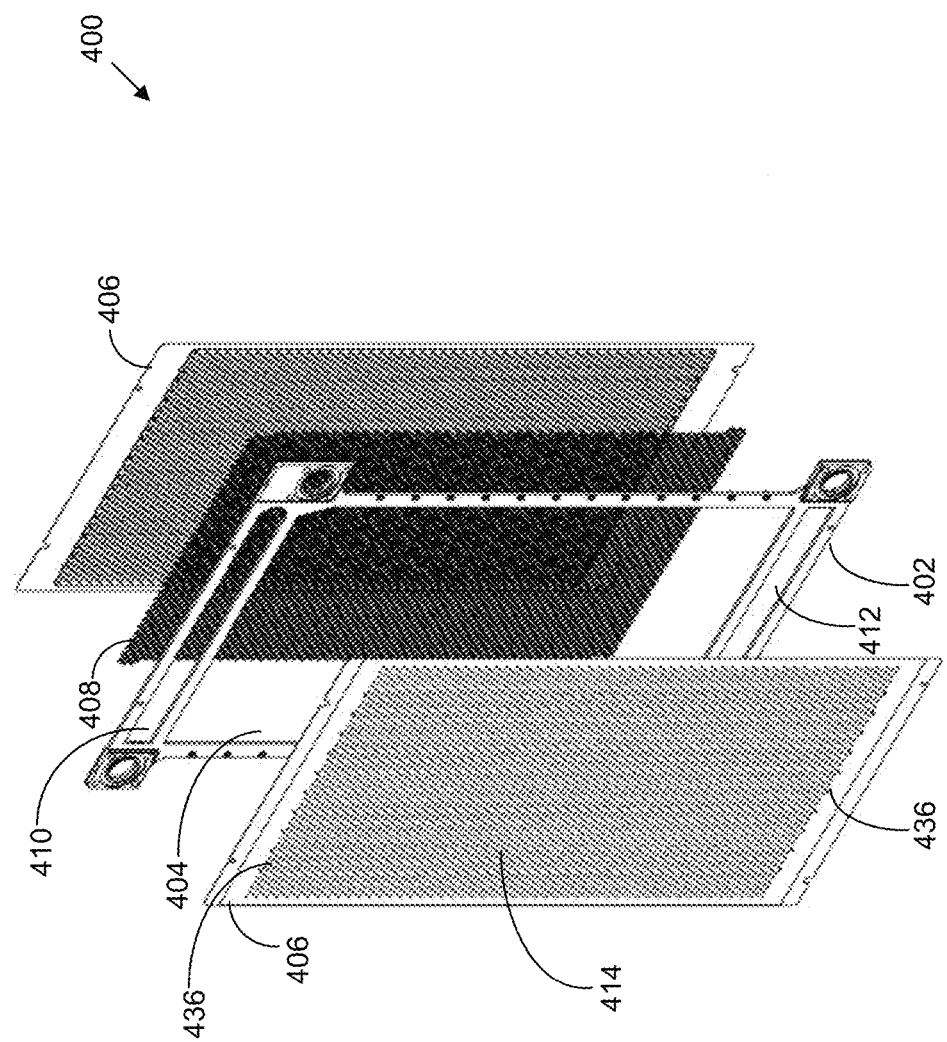
FIG. 4 illustrates an exemplary three-way heat exchanger panel assembly in accordance with one or more embodiments.

FIG. 4 is an exploded view showing construction of a panel assembly 400 in accordance with one or more embodiments. Multiple such panel assemblies are joined in a stacked arrangement to form a three-way heat exchanger block for a liquid desiccant air-conditioning system as will be further described below.

Each panel assembly includes a frame 402 circumscribing or bordering a central space 404. Two plates 406, each having inner and outer surfaces, are joined to the frame (e.g., by welding). The inner surfaces of the plates face each other and define a heat transfer fluid channel therebetween in the central space. A netting or mesh 408 may be disposed in the heat transfer fluid channel to maintain the heat transfer fluid channel thickness under negative pressure and to cause turbulence in the heat transfer fluid flow.

The frame also includes an inlet open space 410 and an outlet open space 412 forming channels or manifolds for distributing and collecting liquid desiccant flowing through the panel assembly as will be further described below.

The outer surface of each plate is covered by a microporous sheet or membrane 414 permitting transfer of water vapor therethrough. The microporous sheet and the outer surface of the plate define a liquid desiccant channel therebetween.

Multiple panel assemblies are stacked next to or on each other such that a microporous sheet on one panel assembly faces a microporous sheet on an adjacent panel assembly, defining an airflow channel between the microporous sheets.

In accordance with one or more embodiments, the frame includes various built-in features that, among other things, maintain the geometry of the channels to help provide equal fluid flows across a panel and in between panels. The features include ports, stand-offs, and corner pieces. The ports facilitate flow of heat transfer fluid through the heat transfer fluid channels and liquid desiccant through the liquid desiccant channels. Having these features on the frame rather than the plates enables a greatly simplified plate design and provides numerous advantages over the prior art panel structures. For example, the plates 406 can be flat sheets. In some embodiments, the plates can be covered by dot features, which can be added by thermoforming, embossing, or similar techniques. The dot features cover the plates uniformly, reducing stresses that can lead to warping of the plates. Flatness of the panels impacts the transfer of heat and humidity between the air and the desiccant.

In accordance with one or more embodiments, the frame comprises an injection molded polymer. It may include energy absorbing doping like carbon black (when laser welded) or other absorbing additives or conductive fibers (when RF/induction-welded) as will be described in further detail below.

In accordance with one or more embodiments, the frame has an integral one-piece construction. In accordance with one or more alternate embodiments, the frame comprises multiple separate pieces that are joined together to form the frame structure.

The mesh 408 in the heat transfer fluid channel helps to maintain the heat transfer fluid channel thickness, particularly if the panel assembly is run under negative pressure to facilitate flow of the heat transfer fluid.

The plates are covered by the membranes 414, which can be heat sealed to the plates in a pattern to form the desiccant channel between the membrane and the plate. The sealing can be direct if the polymers for the plate and the membrane can be welded, e.g., if they are both polyolefins. A cap layer can be added to the plate prior to welding to improve the quality or ease of formation of the heat weld.

FIG. 5A is an interior view of a panel assembly 400 in accordance with one or more embodiments showing the frame with features exaggerated in size for purposes of illustration. The features include ports 420, 422, 424, 426 and spacers or standoffs 428. FIG. 5A also shows weld lines 430, 432, 434 for connecting the frame to the plates. The weld lines 432 define and form the heat transfer fluid channel. The weld lines 430, 434 form channels through which a liquid desiccant is distributed and collected, respectively, in the panel assembly. Openings 436 in each of the plates shown in FIG. 4 are exaggerated in size in FIG. 5A for purposes of illustration. These openings are aligned with the upper and lower open spaces 410, 412 formed in the frame.

The frame can be injection molded with high stability and reliability and minimal warp. The frame defines the height of the heat transfer fluid channel. It also provides rigidity to the panel assembly. The frame is dimensioned to allow use of injection molding to manufacture the frame, which enables precisely defined features.

It is advantageous to locate the features on the frame rather than the plates. Injection molding the features in the plates is difficult given that the plate should be thin (preferably <1 mm for a 30-50 cm panel) to reduce heat resistance between the heat transfer fluid and the air. The thermal resistance of the panel directly drives the approach temperature and thus the effectiveness of the heat exchanger.

The frame can be precisely formed using injection molding to construct high performance panels. For instance, the dimensions of frame can be controlled within less than 0.2 mm. Flatness of the whole structure can be controlled to within a few mms across the full panel (e.g., covering an area of about 2 square feet). The frame incorporates all features needed to connect the panels together and to do that with high accuracy and reliability. This enables the plates to therefore have a simple design, which is suitable for thermoforming and which minimizes stresses during thermoforming.

The liquid desiccant ports 424 and 426 are connected to the liquid desiccant inlet and outlet channels or manifolds 410, 412, respectively. The desiccant enters the inlet desiccant channel 410 via micro channels 431. The die cut holes 436 in plates at the desiccant manifold provide a pathway for the liquid desiccant between the thermoformed plates and the membrane and exit via die cut holes 436 in the plates back to the liquid desiccant channel 412 between the plates. Micro channels 433 connect the outlet channel 412 to the port 436.

The heat transfer fluid ports 420, 422 are connected to the heat transfer fluid channel 404 between adjacent plates by channels 440, 442.

Netting 408 is inserted in the heat transfer fluid channel to enable more constant heat transfer fluid flow rates along all paths between ports 420, 422, provide a generally uniform flow distribution between panels and maintain heat transfer fluid channel height. The netting also provides turbulation of the heat transfer fluid to increase heat transfer. A wide variety of netting materials may be used. For example, the netting may comprise the same polymer material as the plates (e.g., polypropylene, polyethylene, and Acrylonitrile butadiene styrene (ABS)).

An O-ring or gasket 450 at each of the ports creates a seal between adjacent panel assemblies. In accordance with one or more embodiments, the panel assemblies are pulled together using bolts extending through the holes 452 surrounding the ports and secured with nuts. The bolts create sufficient tension compression to ensure leak-free connections at the O-rings or gaskets 450.

The desiccant and heat transfer fluid ports 420, 422, 424, 426 are shown at the side of the panel assembly block extending into the path of the airflow. As a result, the micro channels 431, 433 are substantially horizontal. This provides enough space for having injection molded moveable pins in the inlet and outlet desiccant channels in the frame and in the heat transfer fluid channel. The movable pins create the micro channels in the frame during injection molding. Locating the ports at their particular locations reduces panel width, increases the air path, and allows for different housing designs. The form factor of the panel structure can be a significant design consideration and it will be understood by those skilled in the art that several design options are possible. Given the wide range of applications for the panels, from transportation to industrial and residential, being able to change the form factor of the panel may be important to enable cost effective solutions.

The standoffs or spacers 428 set and maintain the separation between adjacent panel assemblies defining the height of the air channel preferably to within a tolerance of 0.1 mm to 0.3 mm.

The plates can be welded to the frame using, e.g., RF welding or laser welding via paths 430, 432, 434.

Examples of suitable microporous membranes are disclosed in U.S. Pat. No. 9,101,874, which is incorporated by reference herein. By way of example, suitable commercially available membranes can include membranes used in batteries. In one exemplary embodiment, the membranes have 40-80% openness and pore sizes of less than 0.5 micron, and a thickness of less than 100 microns. In one exemplary embodiment, the membrane is the EZ2090 polypropylene, microporous membrane from Celgard. The membrane is approximately 65% open area and has a typical thickness of about 20 μm. This type of membrane is structurally very uniform in pore size and is thin enough to not create a significant thermal barrier. Other possible membranes include membranes from 3M, Lydall, and other manufacturers.

FIG. 5B is a side view of the panel structure illustrating the use of the standoffs 428 in setting channel heights and ports, which define the thickness of the air channel 460 between two stacked panel assemblies 400.

The corners of the frame each include an angled part 462 (shown in FIG. 5A), including the heat transfer fluid channel to the ports 420, 422. The angled part also helps keep the netting 408 in place, intentionally blocking the top and bottom of the heat transfer fluid channel. The vertical areas 466 remain open. Heat transfer fluid first flows into these areas 466 and then moves in a direction perpendicular to the vertical areas 466 across the plate. In one exemplary embodiment, this structure causes the heat transfer fluid to flow through the netting in a direction counter to the air direction.

In accordance with one or more embodiments, the panel structure is oriented to allow for vertical desiccant flow combined with vertical air and heat transfer fluid flows. In one or more embodiments, the panel structure is oriented for horizontal air and heat transfer fluid flows, but vertical desiccant flow. In one or more alternate embodiments, the panel structure is oriented for horizontal desiccant, air, and heat transfer fluid flows. The seal strength can be designed to allow for pressurized rather than mostly gravity driven desiccant flow.

FIG. 6 schematically illustrates an exemplary formed plate 406 for use in a panel assembly in accordance with one or more embodiments. The plate 406 has a significantly simplified structure compared to prior art plate designs. In accordance with one or more exemplary embodiments, the plate is made out of thinly extruded (<1 mm thick) polymers, which could, e.g., be polypropylene, polyethylene, ABS and many other polymers. Additives that improve conductivity can allow for thicker and thus stiffer plates. The plates can be thermoformed, embossed, or alternatively created through injection molding with a pattern of raised features 470 to which a membrane 408 can be heat sealed. The membrane is also sealed around the flat outer border 472 of the plate. One objective is to create a desiccant channel with an average height of less than 0.5 mm that can ensure that the desiccant flows over the panel at a velocity of less than 1 m/min. The actual velocity depends on viscosity and thus on desiccant concentration and temperature as well as pressure.

The plate includes die cut holes 436 (shown in FIG. 6 to be exaggerated in size for purposes of illustration) on top and on the bottom that allow desiccant to enter and exit the panel via the desiccant ports 424, 426 from the desiccant manifolds 410, 412 behind the plates.

Figure 7:
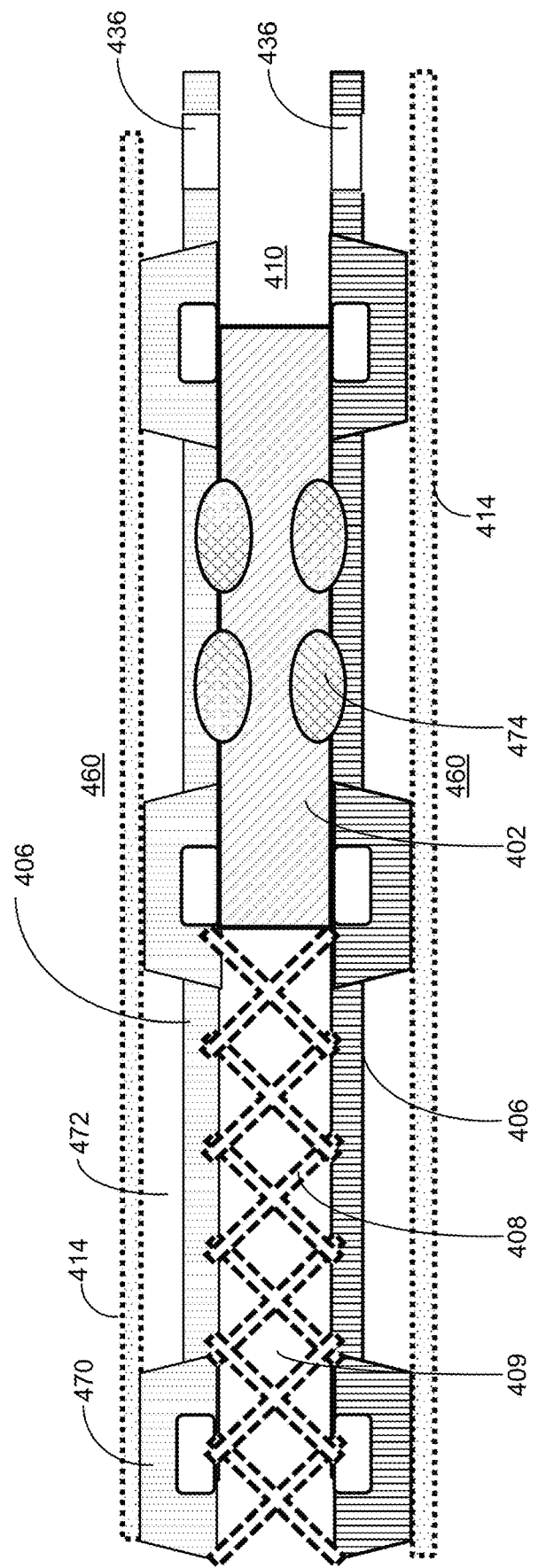
FIG. 7 is a simplified cross-section view of an exemplary panel assembly in accordance with one or more embodiments.

FIG. 7 schematically illustrates how the frame and plates can be welded together. A panel assembly is comprised of the frame 402 and two thermoformed plates 406. A membrane 414 is heat-sealed to the thermoformed plates at raised dots or lines 470. The height of the feature 470 determines the height of the desiccant channel 472. The membrane 414 is microporous, allowing the desiccant in the channel 472 to absorb or desorb humidity from the air in the air channel 460 in-between panels. These membranes can be extremely thin and open with thicknesses of less than 100 micron and openness well over 40%, as discussed above.

The plates can have a cap layer to improve the seal with the membrane. However, direct sealing of membrane to the plate is possible, particularly if they are made with a suitable combination of polyolefins.

Sealing the frame and the thermoformed plates together creates a desiccant channel with die cut holes 436 that allow the desiccant in manifold 410 to enter or exit the desiccant channel 472.

Before sealing the thermoformed plates to the frame, netting 408 is inserted in the heat transfer fluid channel 409. With heat transfer fluid pulled through the channel at negative pressure, the netting 408 sets the height of the heat transfer fluid channel. To allow the heat transfer fluid to be transferred through the heat transfer fluid channel under positive pressure, the netting 408 would need to be fixed and preferably welded to the thermoformed plate 406.

The sealing of the thermoformed plates 406 to the frame 402 is done at weld lines 474 using induction, RF, laser, or other welding techniques that can preferably heat material at a location away from the welding tool and thus away from the membrane 414. The welds 474 can be the same as lines 430, 432, 434 in FIG. 5A. In the case of laser welding, a wavelength is selected for the tool for which the membrane and thermoformed materials are transparent, but which can be absorbed by the frame. Absorption of the laser energy by the frame can be achieved by adding carbon to otherwise transparent polymers like polypropylene or by using polymers that are natural absorbers at that frequency. Alternatively, fibers can be added to the frame to facilitate RF welding, which can enable welding complete blocks rather than individual panel assemblies. The frame should be heated close to the plate, but away from the membrane, which needs to be separated from the plate by a space equal to the height of the desiccant channel 472.

Figure 8:
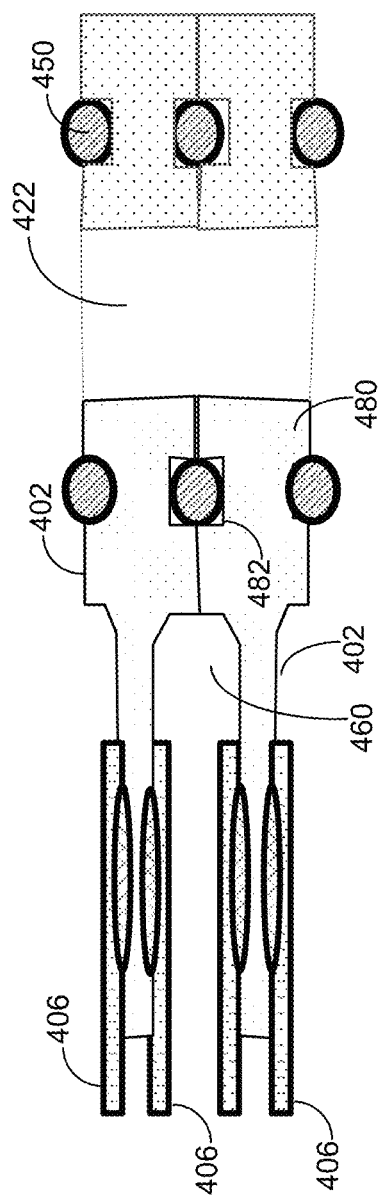
FIG. 8 is a simplified cross-section view of a portion of an exemplary panel assembly in accordance with one or more embodiments.

As shown in FIG. 8, the injection molded frame 402 has various features that support the building of a panel assembly stack with defined air gaps 460 between adjacent panel assemblies. FIG. 8 shows a corner with two panel assemblies around a port 422. Each panel assembly has two sheets 406. The corner is shown with an O-ring 450 to provide a leak free connection between the panel assemblies, rather than a gasket or a welded connection. One skilled in the art would understand that a variety of connection methods could be used. The cost effectiveness of various connection methods depends on volumes and the usage of the parts. For example, O-rings give greater flexibility and thus shock resistance to a stack of panel than a corner welded connection. The panel assemblies can have a precise definition with low tolerances for the air gap 460. This enables generally equal air distribution, which significantly improves performance. The features include corner features 480 around the desiccant and heat transfer fluid manifolds formed by connected ports 422 of panel assemblies. The corners can include a feature 482 to receive O-rings 450. Alternatively, features can be added to allow heat sealing at the corners 480 using, e.g., laser, induction or RF welding. Together with the standoffs 428, they ensure that the height of the panel is generally uniform not just between panels but along the entire length of the panels.

Moving these features away from the formed plates 406 to the frame 402 significantly reduces the complexity of the plates 406. By reducing complexity and ensuring uniformity across the plate, stresses are generally minimized, improving the flatness of the formed plate 406. An injection molded frame 402 is able to maintain accuracy of features within 0.1 mm, a significant improvement over the replicability of similar features previously integrated into the prior art thermoformed plates.

The core of the plates 406 is flat to facilitate the accurate sealing of the plates 406 to the frame at 402, ensuring a strong and consistent seal.

The liquid desiccant panel assemblies in accordance with various embodiments provide several technical advantages over the prior art, including the following.

In one or more embodiments, the fluid passageways into heat transfer fluid and desiccant channels from the main manifolds at the ports provide flow restriction enabling better panel-to-panel desiccant and heat transfer fluid flow distribution within a block assembly. The fluid passageways are sized for manufacturability via injection molding, provide desired fluid pressure drops, and have sufficient strength for the laser-welding.

Controlling the air spaces between panel assemblies via the air separator standoffs 428 improves panel-to-panel air distribution and uniformity of the air gap 460, thereby improving efficiency as well as stack rigidity.

In one or more embodiments, the heat transfer fluid and the desiccant each have only one entry port and one exit port to reduce number of fluid seals and required connections, reducing manufacturing complexity and improving reliability.

In one or more embodiments, the netting or mesh 408 in the heat transfer fluid channel 409 is free-floating with keyed features, which eliminate any mechanical stresses due to thermal expansion, while ensuring optimal flow distribution within and between panels by defining fluid resistance. The mesh 408 defines the heat transfer fluid channel thickness under negative heat transfer fluid pressure ensuring that mesh determines heat transfer fluid and thus air channel thickness and consistency. The mesh 408 also improves panel rigidity during high airflow.

Having certain features on the thermoplastic frame 402 instead of on the plates 406 allows for plastic welding, fluid delivery, heat transfer fluid channel formation, and uniform air gaps when panel assemblies are stacked. A laser transparent thermoformed plate 406 with dot features 470 and subsequently heat-sealed membrane 414 is laser-welded to the frame 402. The frame 402 may be comprised of a thermoplastic with laser-absorbing additive. Sequencing limits weld formation to the thermoform/frame interface, avoiding heat-sealing of the membrane 414 to the thermoform at critical locations. The thickness of the corner feature 480 sets the air gap after assembly with O-rings 450.

In one or more embodiments, the plate thermoforms 406 are fabricated from a transparent thermoplastic with raised dots 470 that define the desiccant channel 472 height, helping ensure a uniform distribution of desiccant. The semipermeable membrane 414, which also has suitable laser transmissivity (e.g., at 940 or 980 nm) is heat sealed to the thermoform plates 406, either directly to the thermoform plate 406 or to an optional lower-melting cap layer thereon. The frames 402 may be fabricated from a thermoplastic with carbon black doping or other laser-absorbing additive. The mesh plate or other heat transfer fluid turbulator plate 408 is inserted in center of the frame 402. The thermoform plate 406 is laser welded with the heat-sealed membrane 414 to the frame 402 on one side, followed by another thermoform plate 406 to the opposite side of the frame 402. The mesh or heat transfer fluid turbulator 408 is enclosed in the interior. The so formed panel assembly 400 is then ready for stacking with other panel assemblies into a block assembly via O-rings 450.

In accordance with one or more embodiments, the set of stacked panel assemblies 400 is supported in a housing structure to form a plate assembly block. It is desirable that the housing and connections around the panel assembly stack not be bulky. A bulky housing can substantially increase the size of liquid desiccant system and create form factors that are different from existing units built around desiccant wheels, coils, plate heat exchangers etc. It is also desirable not to have connections positioned to multiple sides of the block, which can make installation difficult and time consuming. It is desirable to allow all maintenance to be performed from one side of the block, which would reduce the space needed for the unit. It is desirable for the units to be manufactured by commercial production processes. The units should pass UL fire resistance as well as other tests, including transportation, vibration, and handling tests, and be able to withstand both very high and very low transportation and storage temperatures that can significantly exceed operational conditions. It is desirable for the units to be designed for safe handling, e.g., to discourage picking up the modules at potential breakpoints like manifolds. Material costs and the time needed to build the housing impact manufacturing costs significantly, and as panel production costs drop, the cost of housing becomes relatively more important. It is therefore desirable to for the housing to be inexpensively built.

Figure 9:
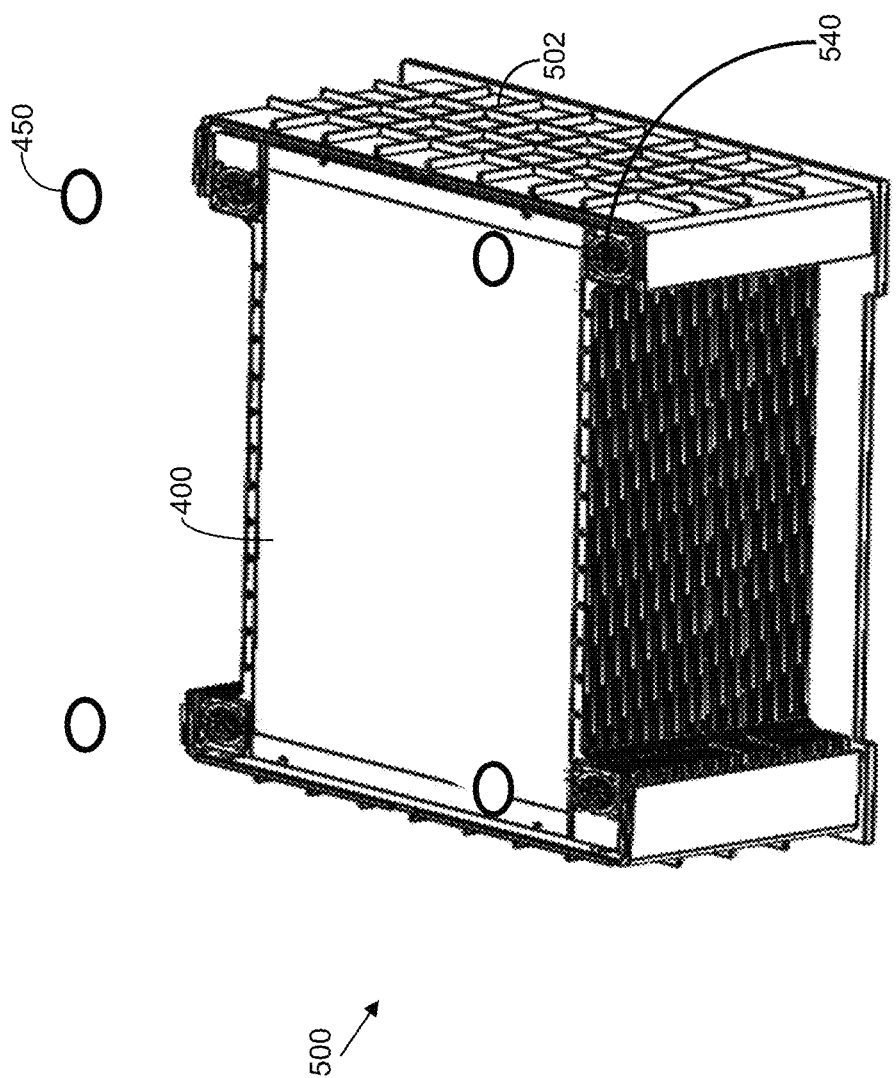
FIG. 9 is a perspective view of an exemplary 3 way heat exchanger block in accordance with one or more embodiments.

FIG. 9 illustrates an exemplary panel assembly block 500 comprising a set of stacked panel assemblies 400 enclosed in a housing structure 502 in accordance with one or more embodiments.

Figure 10:
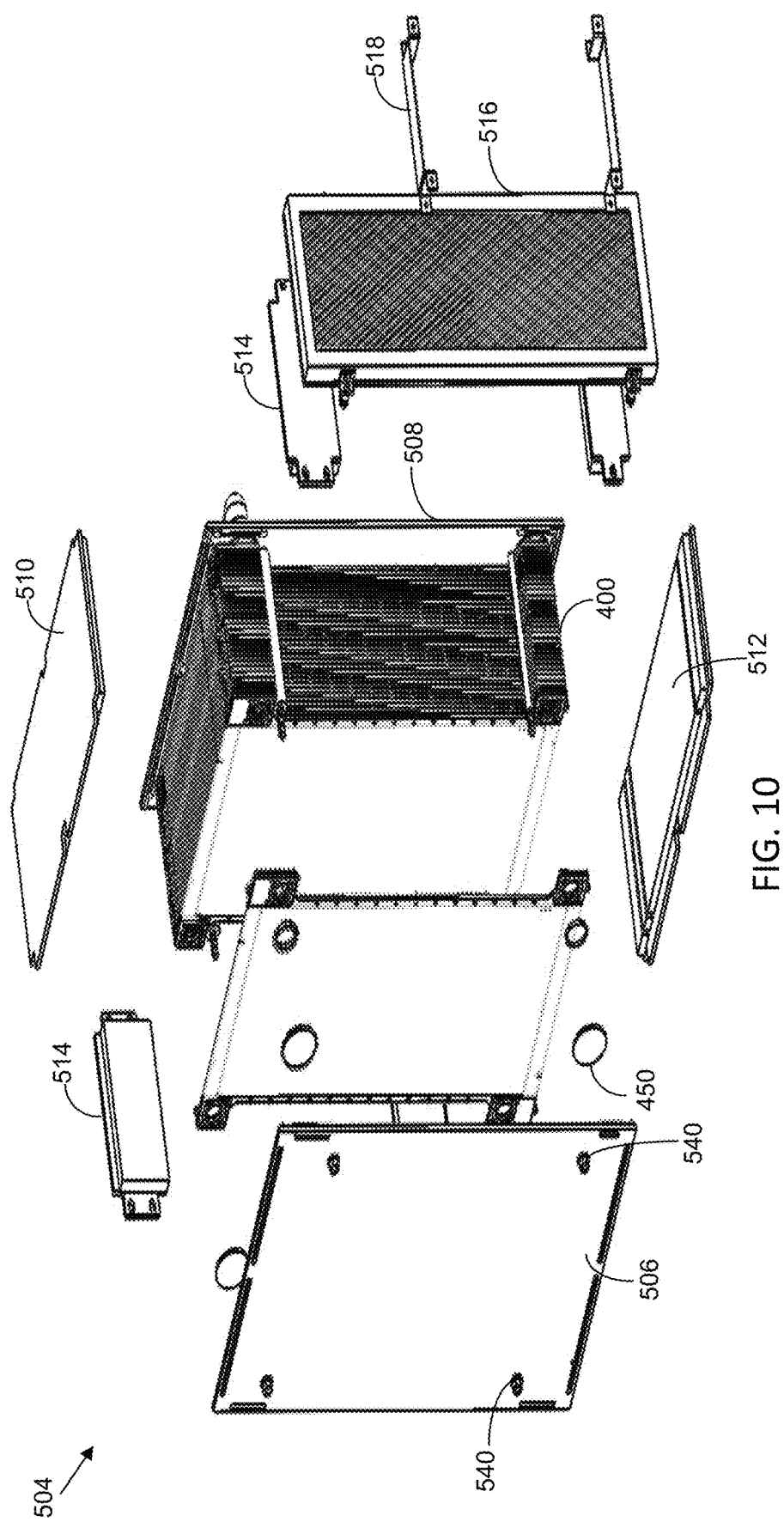
FIG. 10 is an exploded view illustrating portions of an exemplary housing of a 3 way heat exchanger block in accordance with one or more embodiments.

FIG. 10 is an exploded view illustrating another exemplary housing structure 504 for the panel assembly block in accordance with one or more embodiments. The housing structure 504 includes a plurality of housing plates 506, 508, 510, 512 covering opposite sides and the top and bottom of the stacked panel assembly. The front and back of the stacked panel assembly are only partially covered by housing panels 514 to permit airflow through the unit. A metal filter 516 may be secured to the front side of the housing using clamps 518.

The housings for the panel assemblies are designed for use in various liquid desiccant air conditioning systems, including in Dedicated Outside Air Systems (DOAS) for commercial buildings. The life of these units is significantly lower than the life of the buildings in which the units are installed, which can lead to several replacements of HVAC units. Therefore, it would be desirable for a housing design that can be used as a drop-in for existing units.

Similar panel assembly blocks can be used in other air handlers for commercial systems as well as for humidity control in industrial applications. Similar panel assembly blocks can also be used in multi-dwelling residential units, which may be smaller with different form factors.

In accordance with one or more embodiments, the panel assembly blocks are sized for one- or two-man handling and fast low-cost shipping for replacement.

The housing structure for the panel assemblies provides sealing and pathways for process air while it is treated (e.g., cooled and dehumidified) in the conditioner. A similar housing structure can be used for the regeneration panel assembly block where the liquid desiccant is treated (e.g., reconcentrated using heat).

In accordance with one or more embodiments, the panel assembly blocks for conditioning and regeneration can be identical. In some embodiments, the blocks are different, e.g., if insulation is required in the regenerator or if the regenerator unit is located separately or has different fire safety requirements. The blocks can be used without insulation, e.g., when located in conditioned or regeneration air stream.

In accordance with one or more embodiments, connections for heat transfer fluid and liquid desiccant are located on only one side of the unit to permit easier installation.

The O-rings 450 between adjacent panel assemblies enable easy assembly and disassembly of the block unit.

Figure 13:
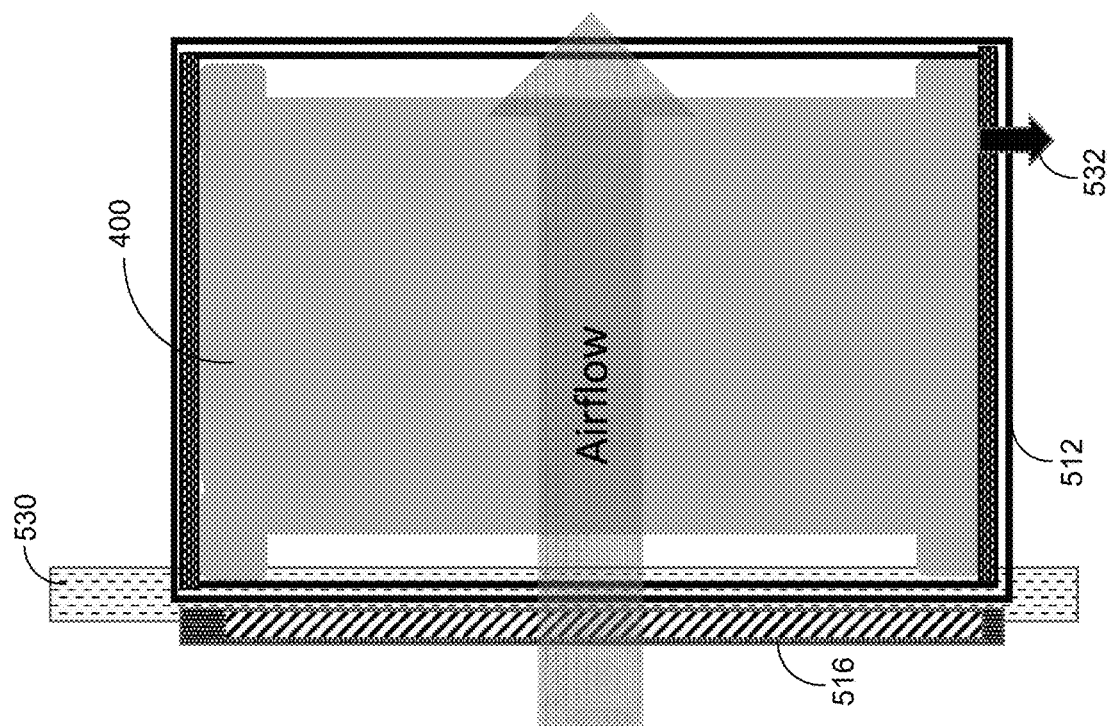
FIG. 13 is a simplified diagram illustrating an exemplary 3 way heat exchanger block in accordance with one or more embodiments.

The housing is configured such that the clamps 518 that latch onto the metal filter 516 can be used for attachment to a plenum divider wall 530, which separates the block inlet air stream from the exit air stream as shown in FIG. 13. The metal filter 516 sits between the incoming air and the block. The block itself is positioned inside the treated air to minimize loss.

On the bottom side 512 of the housing structure, a break 532 in the air seal is made to allow for any condensation or desiccant to be collected. The break in the air seal is at the airflow exit end of the block so that any air leaking through this path has gone through the most of the active area of the panels before exiting. The bottom of the housing has a foam air seal layer to close off the air channels. In case of a membrane or heat transfer fluid channel leak, the desiccant or heat transfer fluid will collect at the bottom of the panel from where it flows through a hole back into a desiccant tank. To prevent it from flowing into the duct, an exit 532 is created that allows the desiccant to pass from the panel to a space inside the housing from where it flows through a tube back into the main desiccant system. A small amount of air might escape through this path, which is why it is located near the end of the block where any leaked air will have been substantially already processed.

The liquid desiccant or condensate can either be collected in a separate container or recirculated back into the system. The desiccant can be collected in a container under the block from the desiccant purge in the block. Alternatively, it can flow back into the desiccant tank. This is preferably done only if the desiccant quality is not affected.

To construct a panel assembly block, the panel assemblies 400 are first assembled into a stack with the heat transfer fluid ports and liquid desiccant ports of each of the panel assemblies aligned to form heat transfer fluid and liquid desiccant port manifolds, respectively.

Figure 14:
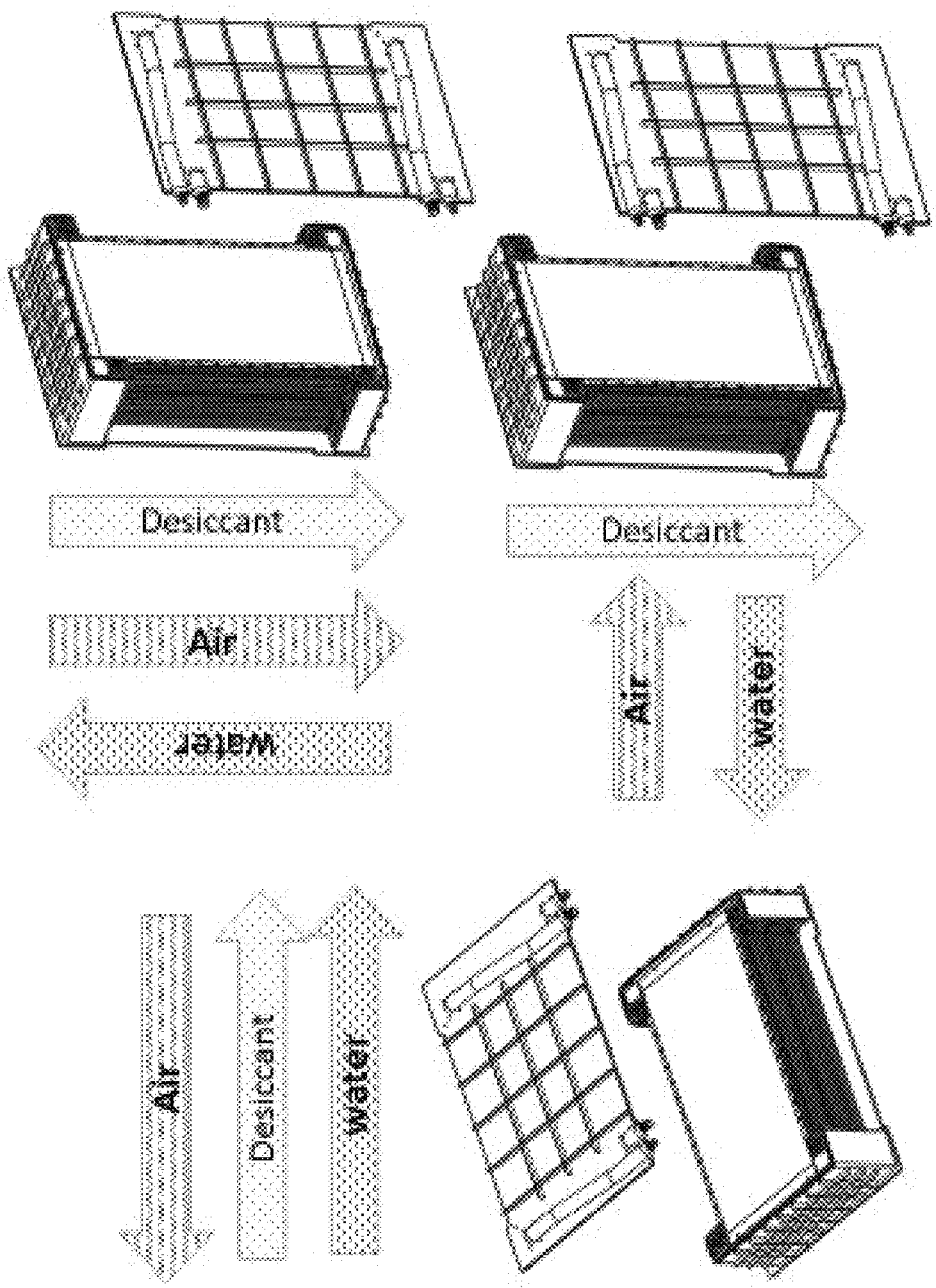
FIG. 14 illustrates examples of different fluid flow directions in various heat exchanger block configurations in accordance with one or more embodiments.

The tension bolts 540 are passed through the housing and the panel assemblies and are subsequently tightened. The tension bolts 540 press the corners of the panel assemblies together. The pressure ensures a sufficient seal with the O-rings 450 in the panel corners. The O-ring structure allows the panel assemblies to absorb the impact of shocks and drops by providing some flexibility unlike, e.g., a welded part that could break in the process. Flat gaskets could be used instead of O-rings, assuming the panels are sufficiently flat. Alternatively, the seals between the panels that create the port manifolds can be formed through induction welding or RF welding, e.g., by incorporating RF receptors in the form of fibers or extra parts in the corners themselves The housing structure can be configured for a variety of directions of air, liquid desiccant, and heat transfer fluid flows as illustrated in FIG. 14. The panel blocks may be configured for vertical, horizontal upright, and horizontal flat airflow. In a vertical airflow panel, the air and desiccant can flow down, while the heat transfer fluid flows up. In an upright panel with horizontal airflow, the desiccant can still flow down from top to bottom but the air is fed in horizontally. The heat transfer fluid can run counterflow to the air.

In one or more embodiments, the panel blocks can be configured as in-ceiling units and other flat units the panels can be put down in an essentially horizontal position, with the air, heat transfer fluid, and the desiccant all flowing horizontally. Heat transfer fluid and desiccant flows can be all horizontal, all vertical, or both depending on what is needed meet form factor requirements at optimal performance. Liquid desiccant flow may be pressure and/or gravity driven flow.

Figure 11:
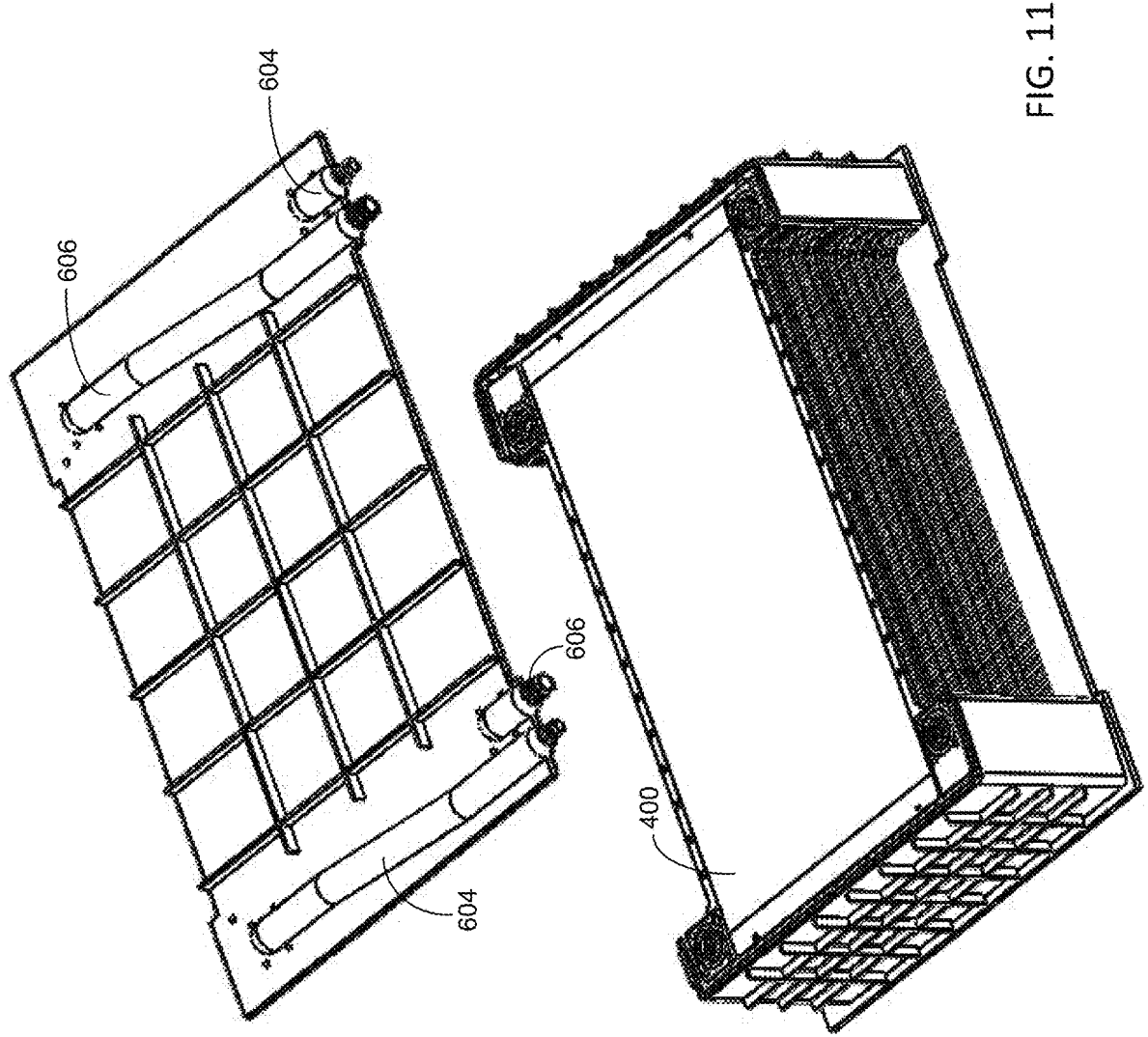
FIG. 11 is an exploded view illustrating portions of another exemplary housing of a 3 way heat exchanger block in accordance with one or more embodiments.
Figure 12:
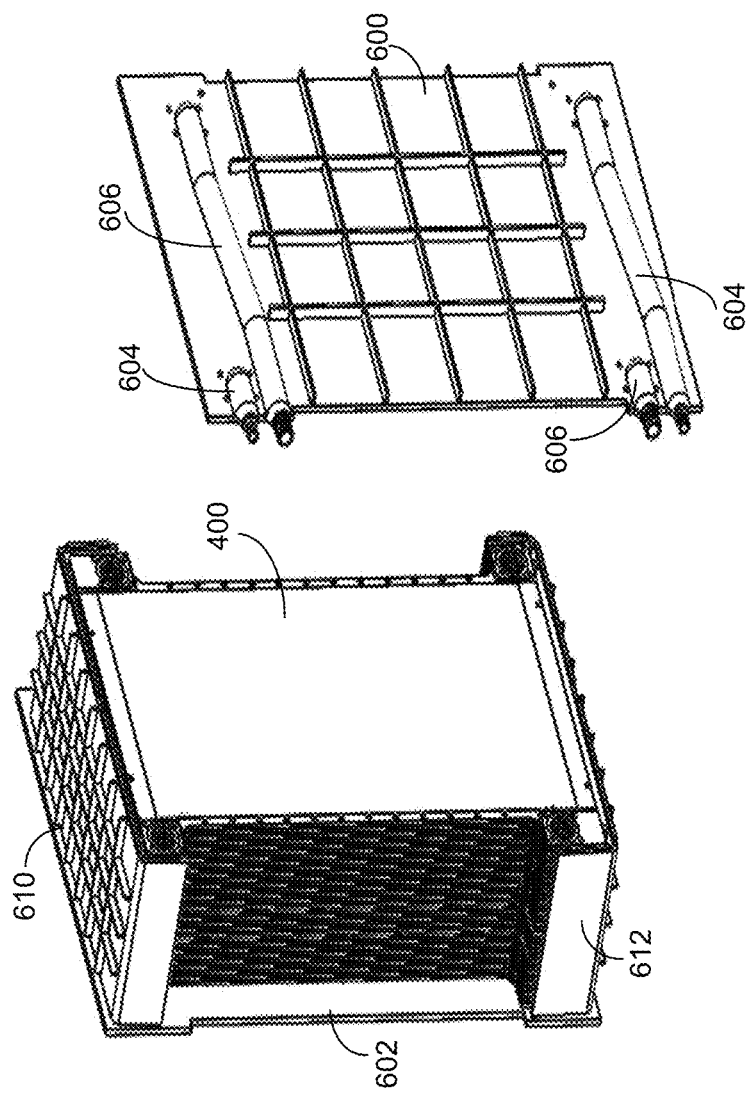
FIG. 12 is an exploded view illustrating portions of another exemplary housing of a 3 way heat exchanger block in accordance with one or more embodiments.

In the FIG. 12 embodiment, the air flow is horizontal, the liquid desiccant flow is vertical, and the heat transfer fluid flow is also vertical (and preferably in counterflow to the liquid desiccant flow). In the FIG. 11 embodiment, all the flows are horizontal with heat transfer fluid in counterflow to the air flow. The liquid desiccant flow can run either counterflow or crossflow to the airflow, depending on the form factor of the panel. It will be understood to those skilled in the art that other flow arrangements like vertical airflow with parallel liquid desiccant and counterflow heat transfer fluid flow are also possible, especially if desiccant flow is driven by pressure rather than gravity.

For a "horizontal flat" panel assembly arrangement, an incline in the panel is desirable to help ensure that any captured air in the heat transfer or desiccant fluids can be removed at the relatively low flow rates inside the panels. The incline can be slight. While flow rates are higher in the ports and manifolds, it is desirable to nevertheless have exits on top or a side of the unit unless form factors for the unit require otherwise, e.g. for ceiling units. Passive draining of the desiccant (and heat transfer fluid) from the unit can be enabled from the lowest point, which tends to be the entry by allowing flow back to the desiccant tank.

The panel assemblies are connected via O-rings or gaskets 450, and the panel assembly stack is kept under compression using tension bars 540. Alignment holes around the manifold port are used to provide consistent alignment of the panel assembly stack. The alignment holes around the manifold ports also inhibit rotation of the connected ports of adjacent panel assemblies.

The features in the housing can be machined in extruded sheets or injection molded. It will be understood by those skilled in the art that other ways of forming the features are also possible.

Extruded housing sheets are lower in cost in smaller quantities but require multiple different cuts and additional piping. Injection molding the parts can significantly reduce the number of parts but involves the high cost of a complex mold. Molding can also provide sufficient stiffness and strength to the housing at lower weights.

In injection molded housing designs, the liquid desiccant and heat transfer fluid passageways can be formed using gas injection molding, such that the cross-sectional area is sufficient to facilitate the required heat transfer fluid and desiccant flow for all of panels in the stack. Clamping on the gas assisted molded housing can be done with the bolts, clamps or ratchets to ensure sufficient pressure to maintain the O-ring seals in the desiccant and heat transfer fluid ports.

As shown in FIG. 12, the panel assemblies 400 are clamped between housing plates 600 and 602. Passageway 604 for the liquid desiccant leading to the liquid desiccant ports 424, 426 and passageways 606 for the heat transfer fluid leading to the heat transfer fluid ports 420, 422 are preferably on only one side of the module for ease of connection and maintenance. This also allows the modules to be positioned close to each other, which reduces unit size and allows for plenum air velocities in the supply duct similar to that of current coils and wheels. This enables drop-in replacement as a result of the comparable footprint and total size.

In FIG. 12, heat transfer fluid enters through the passageway 606 at the bottom of the module and desiccant enters through the passageway 604 at the top, while the respective exits are on the opposite side of the housing.

The stack of panels can be hung from clamps to minimize stress and maintain air gaps and panel shape.

Parts 610 and 612 on the top and bottoms of the module provide air seals around the panel assembly stack, while part 612 also contains a drain for any condensate or liquid desiccant leaks back to the desiccant tank or to a separate container.

The housing material and geometry provide a high level of stiffness to maintain block geometry under high stress loads. This in combination with the inner block materials and in particular with O-ring or gasket connections with flexible connections provides resilience to impacts and vibration without damaging critical seals.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions. Accordingly, the foregoing description and attached drawings are by way of example only and are not intended to be limiting.

The invention claimed is:

1. A three-way heat exchanger for a liquid desiccant air-conditioning system, the three-way heat exchanger comprising a plurality of panel assemblies, each panel assembly comprising:
a frame bordering a central space, the frame including a liquid desiccant inlet port, a liquid desiccant outlet port, a heat transfer fluid inlet port, and a heat transfer fluid outlet port;
two plates, each having an outer surface and an inner surface, wherein the plates are joined to the frame to cover opposite sides of the central space to define a heat transfer fluid channel in the central space defined by the inner surfaces of the plates and the frame, wherein the heat transfer fluid inlet port and the heat transfer fluid outlet port are in fluid communication with the heat transfer fluid channel; and
two microporous sheets permitting transfer of water vapor therethrough, each microporous sheet covering the outer surface of a different one of the two plates and defining a liquid desiccant channel between the micro porous sheet and the outer surface of the plate, wherein the liquid desiccant inlet port and the liquid desiccant outlet port are in fluid communication with the liquid desiccant channel;
wherein the liquid desiccant inlet ports of the frames of the panel assemblies are aligned to form a liquid desiccant inlet manifold, the liquid desiccant outlet ports of the frames of the panel assemblies are aligned to form a liquid desiccant outlet manifold, wherein the heat transfer fluid inlet ports of the frames of the panel assemblies are aligned to form a heat transfer fluid inlet manifold, and the heat transfer fluid outlet ports of the frames of the panel assemblies are aligned to form a heat transfer fluid outlet manifold; and
wherein the plurality of panel assemblies have a stacked arrangement such that a microporous sheet on one panel assembly faces a microporous sheet on an adjacent panel assembly and defines an airflow channel therebetween.

2. The three-way heat exchanger of claim 1, wherein the inner surfaces of the plates and the frame define a liquid desiccant inlet space, and wherein the inner surfaces of the plates and the frame define a liquid desiccant outlet space; and
wherein the plates each include a plurality of spaced-apart openings at the liquid desiccant inlet space such that the liquid desiccant inlet space is in fluid communication with the liquid desiccant channel, and the plates each include a plurality of spaced apart openings at the liquid desiccant outlet space such that the liquid desiccant outlet space is in fluid communication with the liquid desiccant channel.

3. The three-way heat exchanger of claim 2, wherein the plates are joined to the frame along weld or heat seal lines separately circumscribing each of the heat transfer fluid channel, the liquid desiccant inlet space, and the liquid desiccant outlet space.

4. The three-way heat exchanger of claim 1, further comprising sealing O-rings or gaskets positioned between the liquid desiccant inlet ports of adjacent panel assemblies, between the liquid desiccant outlet ports of adjacent panel assemblies, between the heat transfer fluid inlet ports of adjacent panel assemblies, and between the heat transfer fluid outlet ports of adjacent panel assemblies.

5. The three-way heat exchanger of claim 4, further comprising a mechanism for clamping the plurality of panel assemblies together in a sealed arrangement.

6. The three-way heat exchanger of claim 1, wherein the panel assemblies are joined together by an adhesive.

7. The three-way heat exchanger of claim 1, further comprising a netting in the heat transfer fluid channel of each panel assembly for maintaining a given thickness of the heat transfer fluid channel.

8. The three-way heat exchanger of claim 7, wherein the netting is maintained in a position in each heat transfer fluid channel by corner features in the frame such that there is an elongated gap at opposite sides of the netting for distributing the heat transfer fluid across the transfer fluid channel in a direction generally perpendicular to the elongated gaps.

9. The three-way heat exchanger of claim 1, wherein the frame of each panel assembly includes a plurality of stand-offs for defining gaps between adjacent panel assemblies forming the airflow channels.

10. The three-way heat exchanger of claim 1, wherein each of the plates includes a pattern of raised features on their outer surfaces on which the microporous membrane may be attached to form the liquid desiccant channel.

11. The three-way heat exchanger of claim 10, wherein the liquid desiccant channel has a thickness of less than 0.3 mm.

12. The three-way heat exchanger of claim 1, wherein each of the plates includes a cap layer on its outer surface to enhance bonding with the microporous membrane.

13. The three-way heat exchanger of claim 1, wherein each of the plates includes additives to increase heat conductivity or plate stiffness.

14. The three-way heat exchanger of claim 1, wherein each of the plates comprises a polymer having a thickness of less than 1 mm.

15. The three-way heat exchanger of claim 1, wherein the frame of each panel comprises an injection molded polymer.

16. The three-way heat exchanger of claim 1, wherein the frame of each panel assembly includes an energy absorbing dopant, additive, or conductive fiber to improve welding or heat sealing of the frame to a panel.

17. The three-way heat exchanger of claim 1, further comprising a housing structure for supporting the plurality of stacked panel assemblies and providing a sealed pathway for air flow through the three-way heat exchanger.

18. The three-way heat exchanger of claim 17, wherein the housing includes conduits for transferring liquid desiccant and heat transfer fluid into or out of the liquid desiccant or heat transfer fluid ports, wherein the conduits are located on one part of the housing structure.

19. The three-way heat exchanger of claim 17, further comprising a metal filter secured to the housing to an air inlet to the three-way heat exchanger.

20. The three-way heat exchanger of claim 17, wherein the housing includes a bottom panel, the bottom panel includes an opening for removal of any liquid desiccant leakage, heat transfer fluid leakage, or condensate.

21. The three-way heat exchanger of claim 1, wherein the panel assemblies are configured such that the airflow, heat transfer fluid flow, and the liquid desiccant flow are all in a horizontal direction or all in a vertical direction.

22. The three-way heat exchanger of claim 1, wherein the panel assemblies are configured such that one or two of the airflow, heat transfer fluid flow, and the liquid desiccant flow is/are in a horizontal direction and the other(s) is/are in a vertical direction.

23. A method of manufacturing a three-way heat exchanger for a liquid desiccant air-conditioning system, comprising the steps of:
  (a) manufacturing each of a plurality of panel assemblies by:
    (i) covering an outer surface of each of two plates with a microporous sheet permitting transfer of water vapor therethrough, such that a liquid desiccant channel is defined between each microporous sheet and the outer surface of each plate;
    (ii) joining the two plates to a frame structure,
    wherein the frame structure borders a central space and the two plates cover opposite sides of the central space;
    wherein the frame structure includes a liquid desiccant inlet port, a liquid desiccant outlet port, a heat transfer fluid inlet port, and a heat transfer fluid outlet port;
    wherein the plates each have an inner surface opposite the outer surface, and the plates are joined to the frame to define a heat transfer fluid channel in the central space defined by the inner surfaces of the plates and the frame, wherein the heat transfer fluid inlet port and the heat transfer fluid outlet port are in fluid communication with the heat transfer fluid channel; and
    wherein the liquid desiccant inlet port and the liquid desiccant outlet port are in fluid communication with the liquid desiccant channel; and
  (b) arranging the panel assemblies in a stack such that one of the micro porous sheets on one panel assembly faces one of the micro porous sheets on an adjacent panel assembly and defines an airflow channel therebetween and such that such that the liquid desiccant inlet ports of the frames of the panel assemblies are aligned to form a liquid desiccant inlet manifold, and the liquid desiccant outlet ports of the frames of the panel assemblies are aligned to form a liquid desiccant outlet manifold, wherein the heat transfer fluid inlet ports of the frames of the panel assemblies are aligned to form a heat transfer fluid inlet manifold, and the heat transfer fluid outlet ports of the frames of the panel assemblies are aligned to form a heat transfer fluid outlet manifold.

24. The method of claim 23,
  wherein the inner surfaces of the plates and the frame define a liquid desiccant inlet space, and wherein the inner surfaces of the plates and the frame define a liquid desiccant outlet space; and
  wherein the plates each include a plurality of spaced-apart openings at the liquid desiccant inlet space such that the liquid desiccant inlet space is in fluid communication with the liquid desiccant channel, and the plates each include a plurality of spaced apart openings at the liquid desiccant outlet space such that the liquid desiccant outlet space is in fluid communication with the liquid desiccant channel.

25. The method of claim 24, wherein joining the plates to the frame comprises heat sealing or welding the plates along weld or heat seal lines separately circumscribing each of the heat transfer fluid channel, the liquid desiccant inlet space, and the liquid desiccant outlet space.

26. The method of claim 23, further comprising providing sealing O-rings or gaskets between the liquid desiccant inlet ports of adjacent panel assemblies, between the liquid desiccant outlet ports of adjacent panel assemblies, between the heat transfer fluid inlet ports of adjacent panel assemblies, and between the heat transfer fluid outlet ports of adjacent panel assemblies.

27. The method of claim 26, further comprising clamping the plurality of panel assemblies together in a sealed arrangement.

28. The method of claim 23, wherein the plates are joined to the frame using an adhesive.

29. The method of claim 23, further comprising placing a netting in the heat transfer fluid channel of each panel assembly for maintaining a given thickness of the heat transfer fluid channel.

30. The method of claim 23, wherein each of the plates includes a pattern of raised features on their outer surfaces, and the method further comprises attaching the microporous membrane to the raised features form the liquid desiccant channel.

31. The method of claim 23, further comprising forming a cap layer on the outer surface of each plate to enhance bonding with the microporous membrane.

32. The method of claim 23, further comprising securing the three-way heat exchanger in a housing structure providing a sealed pathway for air flow through the three-way heat exchanger.

* * * * *